United States Patent
Ogasawara et al.

(10) Patent No.: US 8,056,669 B2
(45) Date of Patent: Nov. 15, 2011

(54) MOTORCYCLE-USE POWER UNIT

(75) Inventors: Atsushi Ogasawara, Saitama (JP);
Yasushi Fujimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 409 days.

(21) Appl. No.: 12/239,614

(22) Filed: Sep. 26, 2008

(65) Prior Publication Data
US 2009/0139826 A1 Jun. 4, 2009

(30) Foreign Application Priority Data
Nov. 30, 2007 (JP) .................. 2007-310296

(51) Int. Cl.
*B60K 1/00* (2006.01)
*B60K 3/00* (2006.01)

(52) U.S. Cl. ........................ 180/293; 180/291

(58) Field of Classification Search ............ 180/219, 180/221, 230, 220, 229, 291, 292, 293; 123/195 R, 123/195 AC, 196 A, 406.37, 196 R
See application file for complete search history.

(56) References Cited

U.S. PATENT DOCUMENTS

| | | | |
|---|---|---|---|
| 4,613,026 A * | 9/1986 | Ohzono et al. | 192/85.3 |
| 4,669,588 A * | 6/1987 | Hayashi et al. | 192/3.57 |
| 4,860,540 A * | 8/1989 | Hayashi et al. | 60/487 |
| 4,923,027 A * | 5/1990 | Hayashi et al. | 180/219 |
| 5,065,578 A * | 11/1991 | Nakajima et al. | 60/464 |
| 5,078,105 A * | 1/1992 | Ito et al. | 123/195 R |
| 5,778,857 A * | 7/1998 | Nakamura et al. | 123/406.37 |
| 5,860,404 A * | 1/1999 | Tanaka | 123/196 R |
| 7,055,487 B2 * | 6/2006 | Kawakubo et al. | 123/196 A |
| 7,448,355 B2 * | 11/2008 | Haze et al. | 123/195 R |
| 2005/0202931 A1 * | 9/2005 | Yoshida et al. | 477/39 |
| 2008/0081714 A1 * | 4/2008 | Ogasawara et al. | 474/18 |
| 2008/0081727 A1 * | 4/2008 | Ogasawara et al. | 180/221 |
| 2008/0087119 A1 * | 4/2008 | Shiozaki | 74/330 |

FOREIGN PATENT DOCUMENTS

| | | | |
|---|---|---|---|
| JP | 2000-168383 A | 6/2000 |
| JP | 2006-105131 A | 4/2006 |
| JP | 2006-117174 A | 5/2006 |
| JP | 2007-290580 A | 11/2007 |

* cited by examiner

*Primary Examiner* — Hau Phan
(74) *Attorney, Agent, or Firm* — Birch, Stewart, Kolasch & Birch LLP

(57) ABSTRACT

In a motorcycle-use power unit in which a clutch device arranged in a power transmission path between a crankshaft and a drive wheel is housed in a clutch chamber which is defined between a crankcase and a clutch cover joined to a side surface of the crankcase, the maintenance of the clutch control device can be easily performed while preventing a lowering of oil-pressure transmission efficiency between the clutch device and the clutch control device and preventing an increase in the weight of the motorcycle. A clutch control device performs a changeover of engagement and disengagement of a clutch device by controlling the oil pressure applied to the clutch device. Oil passages for connecting the clutch control device and the clutch device with each other are mounted on a clutch cover.

20 Claims, 14 Drawing Sheets

MOTORCYCLE-USE POWER UNIT

CROSS-REFERENCE TO RELATED APPLICATIONS

The present application claims priority under 35 USC 119 to Japanese Patent Application No. 2007-310296 filed on Nov. 30, 2007 the entire contents of which are hereby incorporated by reference.

BACKGROUND OF THE INVENTION

1. Field of the Invention

The present invention relates to a motorcycle-use power unit including a crankcase which constitutes a portion of an engine body mounted on a vehicle body frame. A clutch device is arranged in a power transmission passage between the crankshaft and a drive wheel so as to engage or disengage the transmission of rotational power of the crankshaft which is rotatably and pivotally supported on the crankcase toward the drive wheel. A clutch cover is joined to either one of left and right side surfaces of the crankcase in a state that the crankcase is mounted on the vehicle body frame so as to form a clutch chamber which houses the clutch device between the clutch cover and the crankcase. A clutch control device performs a changeover of engagement and disengagement of the clutch device.

2. Description of Background Art

JP-A-2006-117174 discloses a motorcycle-use power unit in which a clutch control device which performs a changeover of engagement and disengagement of a clutch device is arranged in a space surrounded by seat rails of a vehicle body frame which supports an engine body.

In the structure of the power unit disclosed in JP-A-2006-117174, which arranges the clutch control device in a state wherein the clutch control device is surrounded by the seat rails, it is necessary to remove a rider's seat supported on the seat rails in performing the maintenance of the clutch control device. Thus, there exists a drawback that the maintenance of the clutch control device cannot be easily performed. Further, a pipe which connects the clutch device and the clutch control device with each other is elongated thus giving rise to drawbacks wherein a weight of the motorcycle is increased and, at the same time, the transmission efficiency of an oil pressure is lowered.

SUMMARY AND OBJECTS OF THE INVENTION

The present invention has been made under such circumstances and it is an object of an embodiment of the present invention to provide a motorcycle-use power unit which can easily perform maintenance on a clutch control device while suppressing the lowering of oil-pressure transmission efficiency between a clutch device and a clutch control device and suppressing an increase in the weight of the motorcycle.

To achieve the above-mentioned object, an embodiment of the present invention provides a motorcycle-use power unit which includes a crankcase which constitutes a portion of an engine body mounted on a vehicle body frame. A clutch device is arranged in a power transmission passage between the crankshaft and a drive wheel so as to engage or disengage the transmission of rotational power of the crankshaft which is pivotally rotatably supported on the crankcase toward the drive wheel. A clutch cover is joined to either one of left and right side surfaces of the crankcase in a state wherein the crankcase is mounted on the vehicle body frame so as to form a clutch chamber which houses the clutch device between the clutch cover and the crankcase. A clutch control device performs a changeover of engagement and disengagement of the clutch device. The clutch control device performs the changeover of engagement and disengagement of the clutch device by controlling an oil pressure applied to the clutch device. Oil passages which connect the clutch control device and the clutch device with each other are mounted on the clutch cover.

According to an embodiment of the present invention, an oil filter which is arranged between the clutch control device and an oil pump is arranged on the clutch cover in a detachable manner from the outside.

According to an embodiment of the present invention, the motorcycle-use power unit includes first and second branched oil passages in which oil discharged from the oil pump flows in a bifurcated manner. The first branched oil passage is connected to the clutch control device. The second branched oil passage in the middle of which a pressure-reducing valve mounted on the clutch cover is put is connected to another oil-pressure control device.

According to an embodiment of the present invention, the clutch device is constituted as a twin type which includes first and second clutches. A pair of individual control means which constitutes the clutch control device for individually controlling engagement and disengagement of the first and second clutches and the oil filter are arranged at positions different from each other in the vertical direction of the engine body.

According to an embodiment of the present invention, the clutch cover is joined to a side surface of the crankcase on a side opposite to a side stand supported on the vehicle body frame or the engine body in the width direction of the vehicle body frame.

A first oil pump 209 described in the embodiment corresponds to the oil pump of the present invention with a first oil filter 216 described in the embodiment corresponds to the oil filter of the present invention. A valve-operating oil-pressure control device 221 described in the embodiment corresponds to another oil-pressure control device of the present invention. A first solenoid-operated control valve 235 and a second solenoid-operated control valve 236 described in the embodiment correspond to the individual control means of the present invention.

According to an embodiment of the present invention, the clutch control device which performs a changeover of engagement and disengagement of the clutch device and the oil passage which connects the clutch control device and the clutch device with each other are mounted on the outer surface of the clutch cover which is joined to either one of left and right side surfaces of the crankcase in a state that the engine body is mounted on the vehicle body frame. Accordingly, by arranging the clutch control device and the oil passage on the clutch cover in a concentrated manner, it is possible to perform the maintenance of the clutch control device from a side of the engine body whereby the maintenance of the clutch control device can be easily performed. Further, by removing the clutch cover from the crankcase, the clutch control device and the oil passage can be collectively removed from the engine body. Thus, the maintenance of the engine body can be further easily performed. Further, by shortening a length of the oil passage which connects the clutch control device and the clutch device with each other, it is possible to enhance the oil-pressure transmission efficiency while avoiding an increase in the weight of the power unit attributed to the oil passage.

According to an embodiment of the present invention, since the oil filter which is arranged between the clutch control device and the oil pump is mounted on the clutch cover in a detachable manner from the outside, the maintenance of the oil filter also can be easily performed.

According to an embodiment of the present invention, the oil discharged from the oil pump flows in the first and second branched oil passages in a bifurcated manner. The first branched oil passage is connected to the clutch control device. The second branched oil passage in the middle of which a pressure-reducing valve mounted on the clutch cover is positioned is connected to another oil-pressure control device. Accordingly, by mounting the large number of parts for the clutch control device and another oil-pressure control device on the clutch cover in a concentrated manner, these parts can be also be removed by merely removing the clutch cover from the crankcase thus facilitating the maintenance of the oil filter. Further, the pressure reducing valve is put in the middle of the second branched oil passage. Thus, it is possible to efficiently assemble a hydraulic system such that an oil pressure suitable for the clutch control device and another oil-pressure control device is applied to these devices.

According to an embodiment of the present invention, even when the clutch control device includes the individual control means which individually correspond to the first and second clutches of the clutch device constituted as a twin type, the oil filter and both individual control means are arranged at positions different from each other in the vertical direction of the engine body. Accordingly, it is possible to prevent both individual control means and the oil filter from largely projecting sideward from the engine body while mounting both individual control means and the oil filter on the clutch cover.

According to an embodiment of the present invention, the clutch cover is joined to a side surface of the crankcase on a side opposite to a side stand supported on the vehicle body frame or the engine body in the width direction of the vehicle body frame. Accordingly, when the motorcycle is held in a parking state by erecting the side stand, the clutch cover is directed in the oblique upward direction. Accordingly, it is possible to further enhance the maintenance property of the clutch control device and parts including the oil passages which connect the clutch control device and the clutch device with each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a mode for carrying out the present invention is explained in conjunction with one embodiment of the present invention shown in attached drawings.

Figure 1:
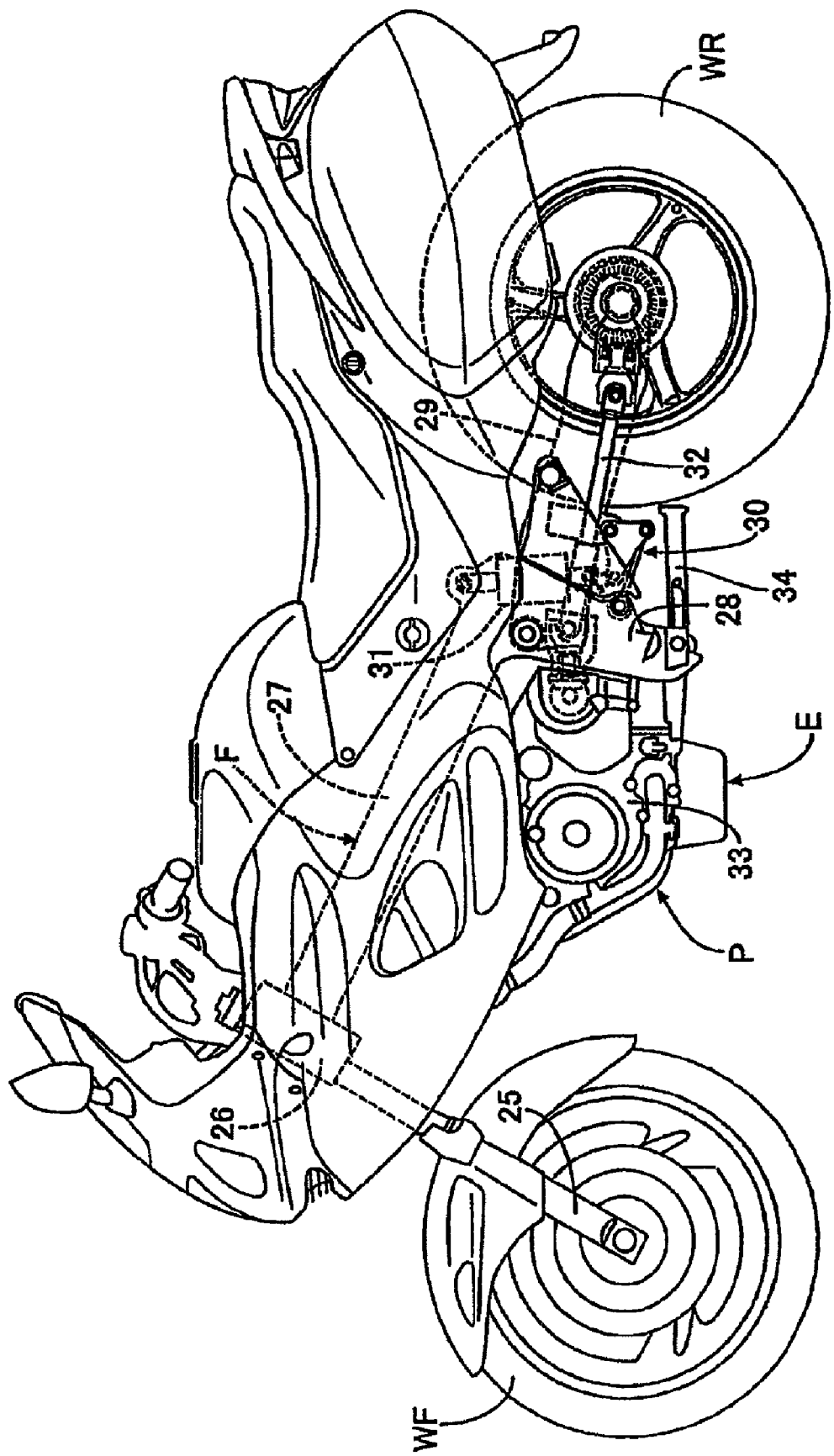
FIG. 1 is a left side view of a motorcycle.

FIG. 1 to FIG. 14 are views showing one embodiment of the present invention. As illustrated in FIG. 1, a vehicle body frame F of the motorcycle which is a saddle-ride type vehicle includes a head pipe 26 which steerably mounts a front fork 25 pivotally supporting a front wheel WF thereon with a pair of left and right main frames 27 which extends in the rearward and downward direction from the head pipe 26. A pair of left and right pivot plates 28, which is contiguously mounted on rear portions of both main frames 27, extends downwardly. A rear wheel WR is pivotally supported on rear portions of swing arms 29 which have front ends thereof swingably supported on the pivot plates 28. Further, a link 30 is arranged between lower portions of the pivot plates 28 and front portions of the swing arms 29 with a shock absorber 31 arranged between upper portions of the pivot plates 28 and the link 30.

From the main frames 27 and the pivot plates 28, a power unit P constituted of an engine E and a transmission 103 (see FIG. 9) is suspended. Rotational power outputted from the transmission 103 is transmitted to the rear wheel WR by way of a drive shaft 32 extending in the longitudinal direction.

A side stand 34 is mounted on an engine body 33 of the engine E or the vehicle body frame F. In this embodiment, the side stand 34 is mounted on a lower portion of the left pivot plate 28 of the vehicle body frame F. Accordingly, when a rider parks the motorcycle while erecting the side stand 34, the motorcycle is inclined to a left side.

Figure 2:
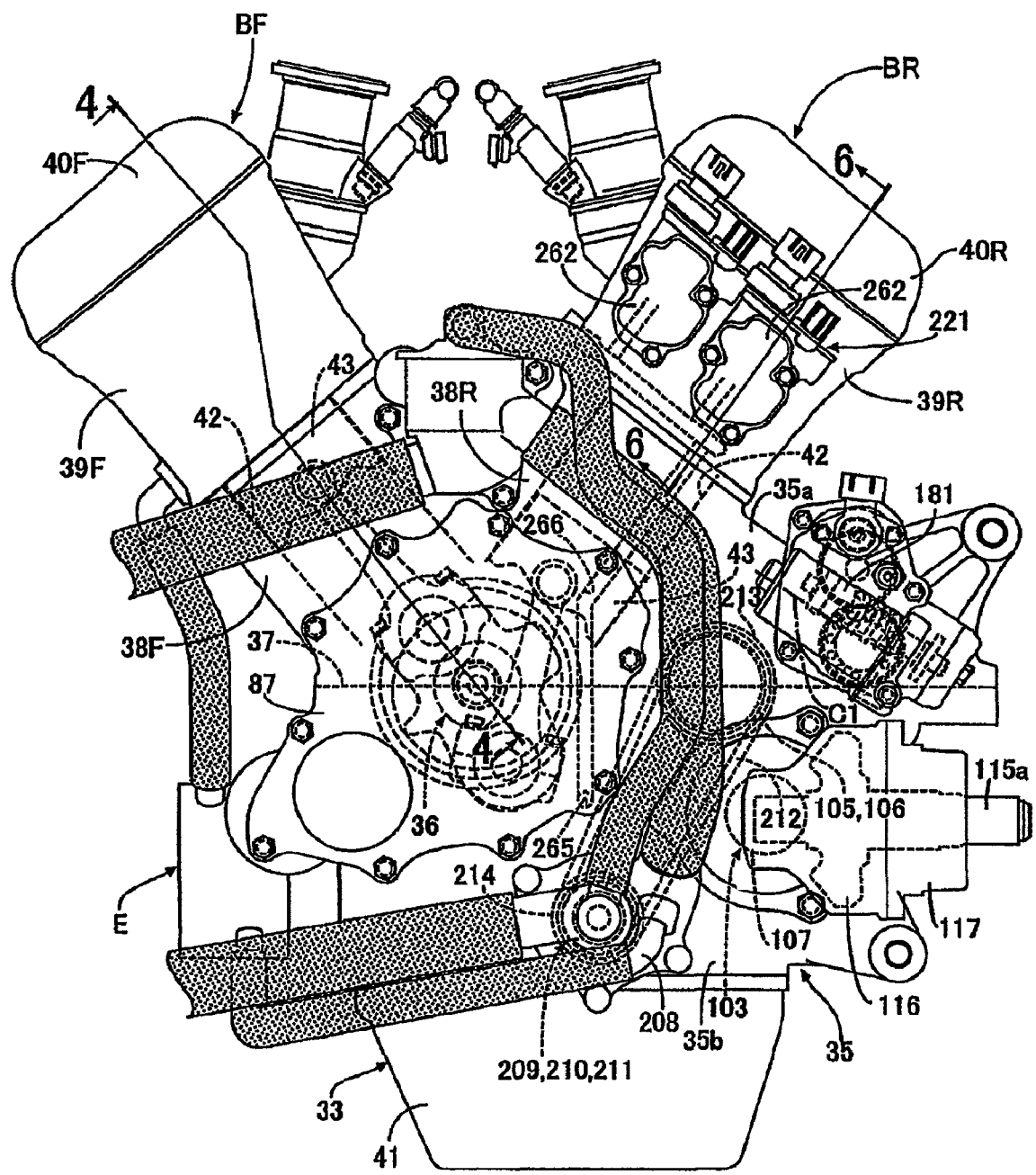
FIG. 2 is a left side view of a power unit.
Figure 3:
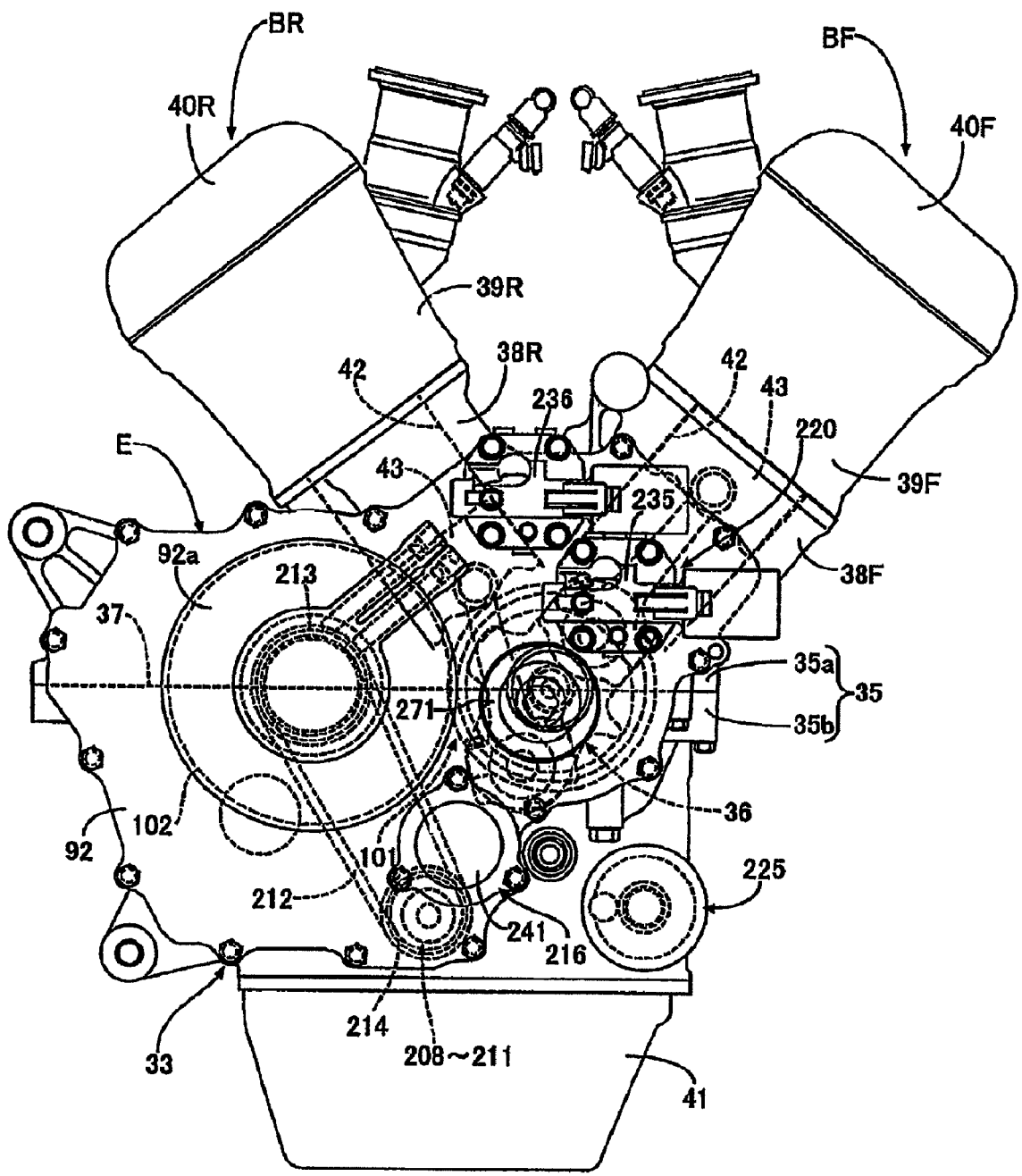
FIG. 3 is a right side view of the power unit.

In FIG. 2 and FIG. 3, the engine body 33 of the engine E is of a V-shaped water-cooled type which includes a front bank BF positioned on a front side in a state that the front bank BF is mounted on the motorcycle and a rear bank BR positioned behind the front bank BF. A crankshaft 36 which extends in the lateral direction of the motorcycle is rotatably supported on a crankcase 35 which is shared in common by both banks BF, BR.

The crankcase 35 is formed by joining an upper case half body 35*a* and a lower case half body 35*b*, wherein front and rear cylinder blocks 38F, 38R are integrally formed with the upper case half body 35*a* in a V-shaped manner, and an axis of the crankshaft 36 is arranged on a joint surface 37 of the upper case half body 35*a* and the lower case half body 35*b*.

The front bank BF is constituted of a front cylinder block 38F, a front cylinder head 39F which is joined to the front cylinder block 38F, and a front head cover 40F which is joined to the front cylinder head 39F. The rear bank BR is constituted of a rear cylinder block 38R, a rear cylinder head 39R which is joined to the rear cylinder block 38R, and a rear head cover 40R which is joined to the rear cylinder head 39R. An oil pan 41 is joined to a lower portion of the crankcase 35.

In the front cylinder block 38F, two cylinder bores 42 are formed which are arranged parallel to each other in the axial direction of the crankshaft 36. The front cylinder block 38F is joined to the crankcase 35 such that axes of the cylinder bores 42 are inclined frontwardly and upwardly in a state that the engine body 33 is suspended on the vehicle body frame F. Further, in the rear cylinder block 38R, two cylinder bores 42 are formed which are arranged parallel to each other in the axial direction of the crankshaft 36. The rear cylinder block 38R is joined to the crankcase 35 such that axes of the respective cylinder bores 42 are inclined rearwardly upwardly in a state that the engine body 33 is suspended from the vehicle body frame F. Further, pistons 43 which are respectively slidably fitted in both cylinder bores 42 of the front bank BF and pistons 43 which are respectively slidably fitted in both cylinder bores 42 of the rear bank BR are connected to the crankshaft 36 in common.

Figure 4:
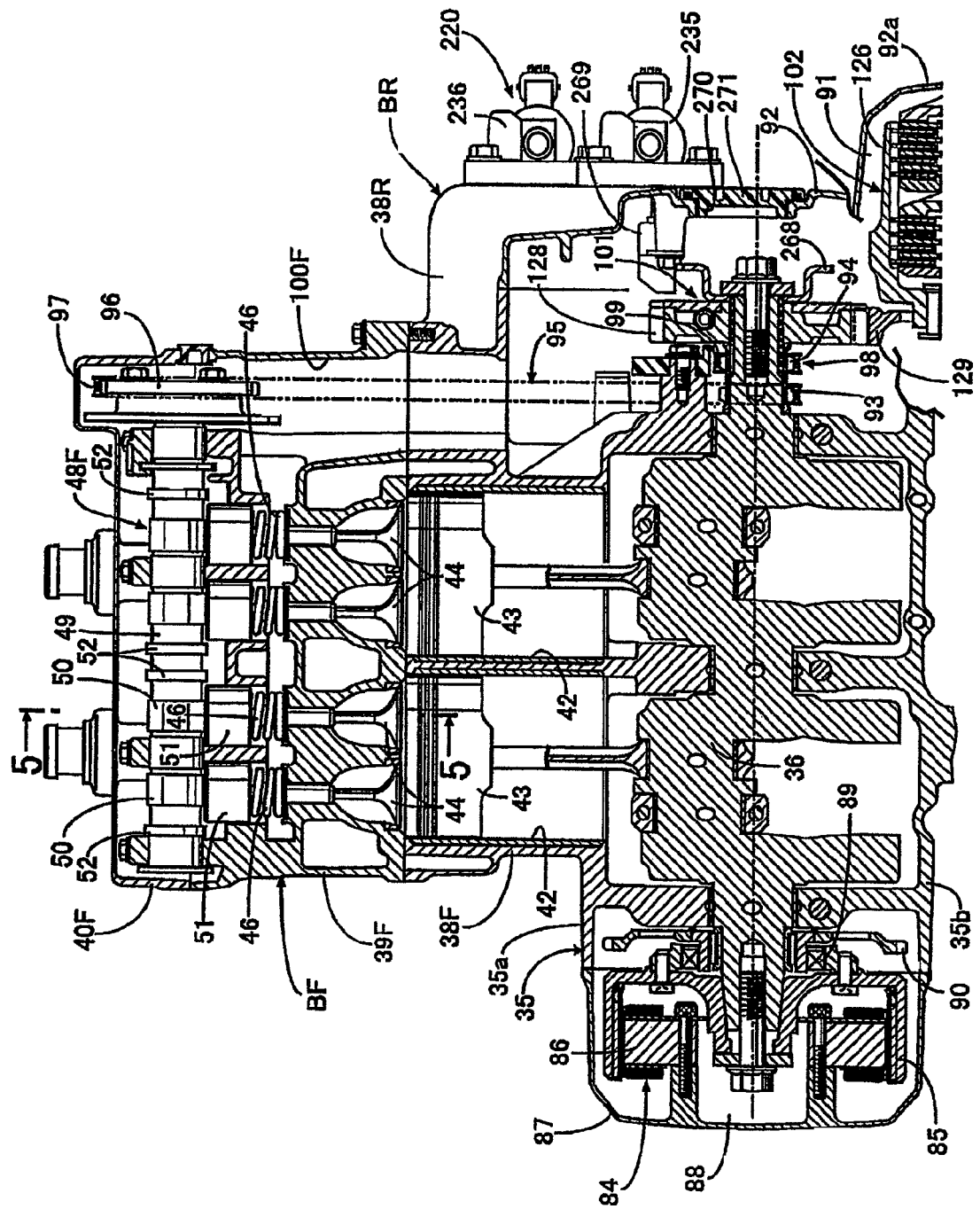
FIG. 4 is a cross-sectional view taken along a line 4-4 in FIG. 2.
Figure 5:
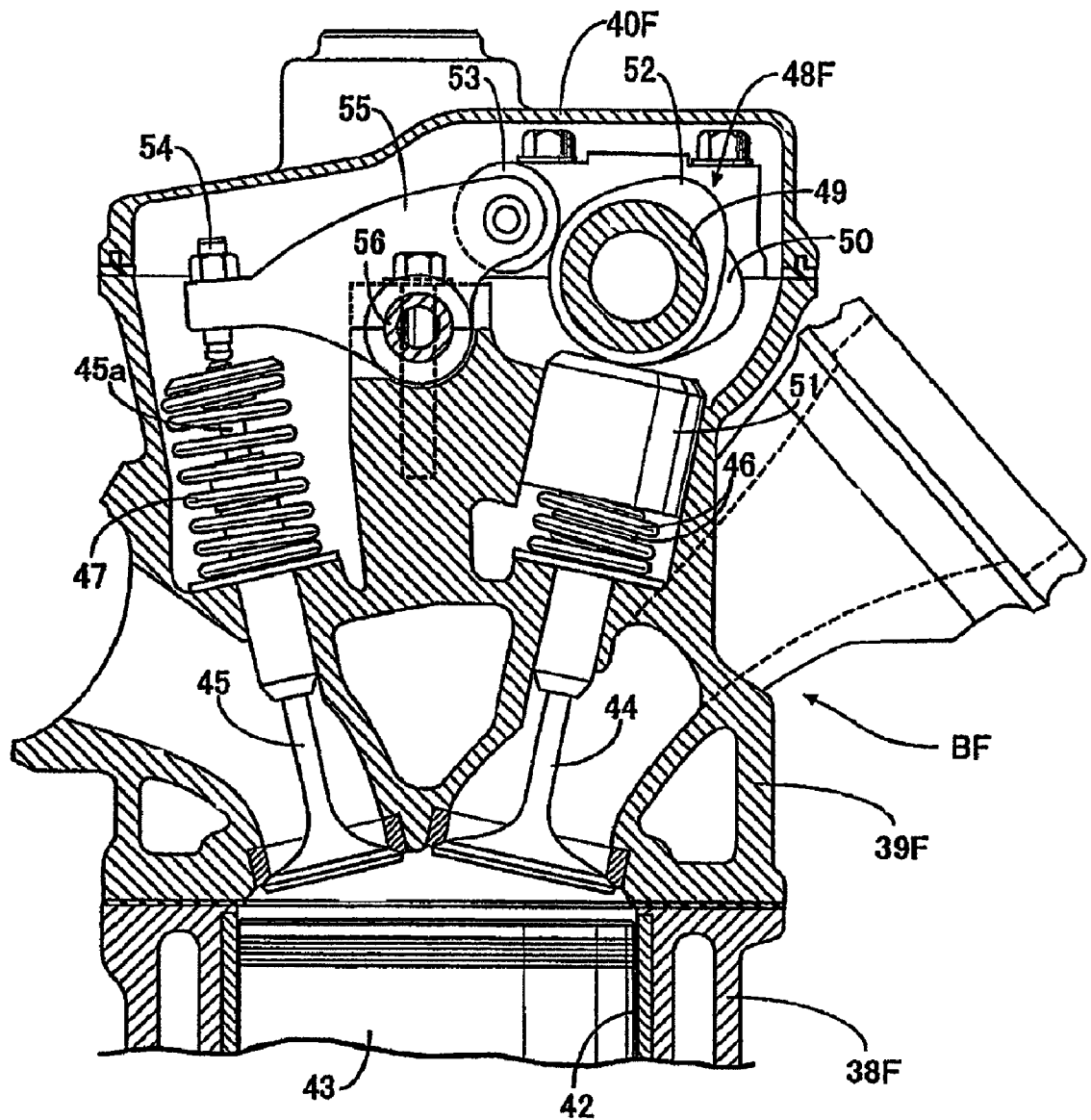
FIG. 5 is a cross-sectional view taken along a line 5-5 in FIG. 4.

In FIG. 4 and FIG. 5, in the front cylinder head 39F, pairs of intake valves 44 are arranged for the respective cylinder bores 42 in an openable manner in a state that the pairs of intake valves 44 are biased in the valve-closing direction by pairs of valve springs 46 and, at the same time, pairs of exhaust valves 45 are arranged in an openable manner in a state that the pairs of exhaust valves 45 are biased in the valve-closing direction by pairs of valve springs 47. The intake valves 44 and the exhaust valves 45 are opened and closed by a front-bank-side valve-operation device 48F.

The front-bank-side valve-operation device 48F includes a cam shaft 49 which is rotatably supported on the front cylinder head 39F while having an axis parallel to the crankshaft 36 and is arranged above the intake valves 44, intake-side valve lifters 51 which are interposed between a plurality of (four in this embodiment) intake-side cams 50 mounted on the cam shaft 49 and the intake valves 44 and are slidably fitted in the front cylinder head 39F. Rocker arms 55 which mount rollers 53 are brought into rolling contact with a plurality of (four in this embodiment) exhaust-side cams 52 mounted on the cam shaft 49 on one end thereof and allow tappet screws 54 brought into contact with upper ends of stems 45a of the respective exhaust valves 45 to threadedly engage with another end thereof in a state that advancing or retracting positions of the tappet screws 54 are adjustable. The rocker arms 55 are rockably supported on a rocker shaft 56 which has an axis parallel to the cam shaft 49 and is fixedly mounted on the front cylinder head 39F.

Figure 6:
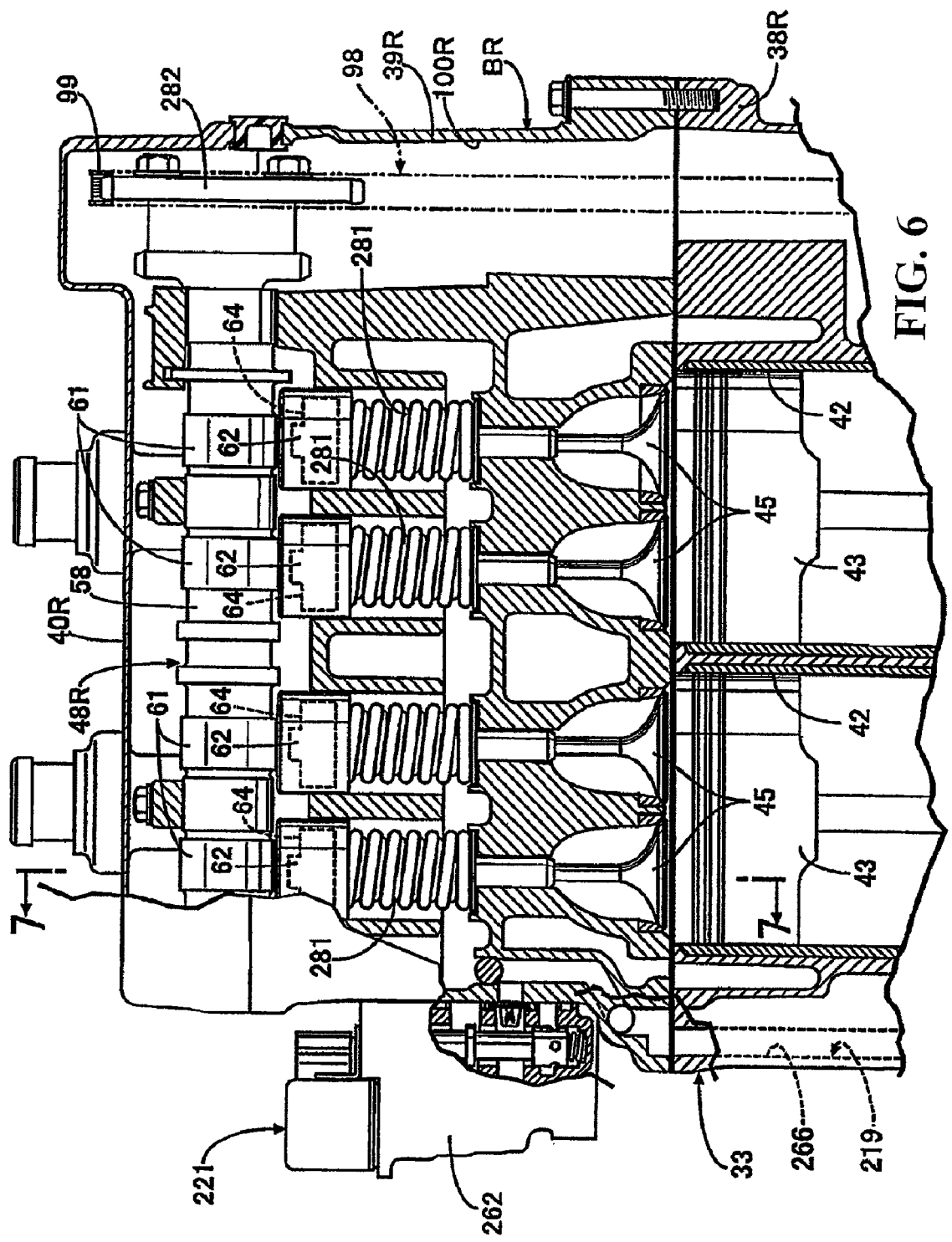
FIG. 6 is a cross-sectional view taken along a line 6-6 in FIG. 2.
Figure 7:
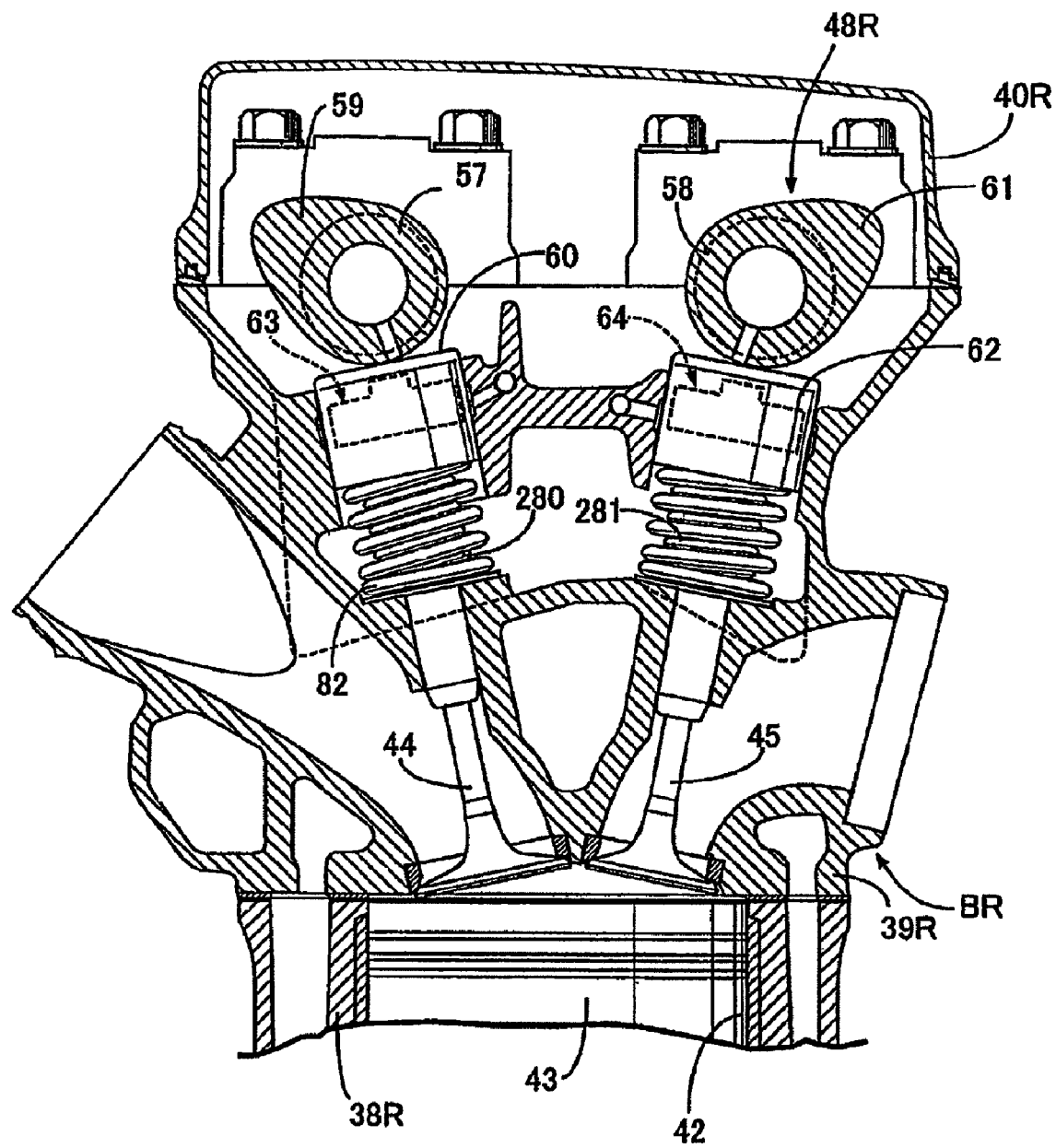
FIG. 7 is a cross-sectional view taken along a line 7-7 in FIG. 6.

In FIG. 6 and FIG. 7, in the rear cylinder head 39R, pairs of intake valves 44 and pairs of exhaust valves 45 are arranged for the respective cylinder bores 42 in an openable manner in a state that the pairs of intake valves 44 and the pairs of exhaust valves 45 are biased in the valve-closing direction by valve springs 280, 281. These intake valves 44 and the exhaust valves 45 are opened and closed by a rear-bank-side valve-operation device 48R.

The rear-bank-side valve-operation device 48R includes an intake-side cam shaft 57 which is rotatably supported on the rear cylinder head 39R while having an axis parallel to the crankshaft 36 and is arranged above the intake valves 44. An exhaust-side cam shaft 58 is rotatably supported on the rear cylinder head 39R while having an axis parallel to the crankshaft 36 and is arranged above the exhaust valves 45. Intake-side valve lifters 60 which are interposed between a plurality of (four in this embodiment) intake-side cams 59 mounted on the intake-side cam shaft 57 and the intake valves 44 and are slidably fitted in the rear cylinder head 39R. Exhaust-side valve lifters 62 which are interposed between a plurality of (four in this embodiment) exhaust-side cams 61 mounted on the exhaust-side cam shaft 58 and the exhaust valves 45 and are slidably fitted in the rear cylinder head 39R.

Further, on the rear-bank-side valve-operation device 48R, an intake-side valve-operation-state changing mechanism 63 which can change over operation-states of the intake valves 44 of two cylinders of the rear bank BR between an open-close operation state and a closed-valve resting state and an exhaust-side valve-operation-state changing mechanism 64 which can change over operation states of the exhaust valves 45 of two cylinders between an open-close operation state and a closed-valve resting state are additionally mounted.

Figure 8:
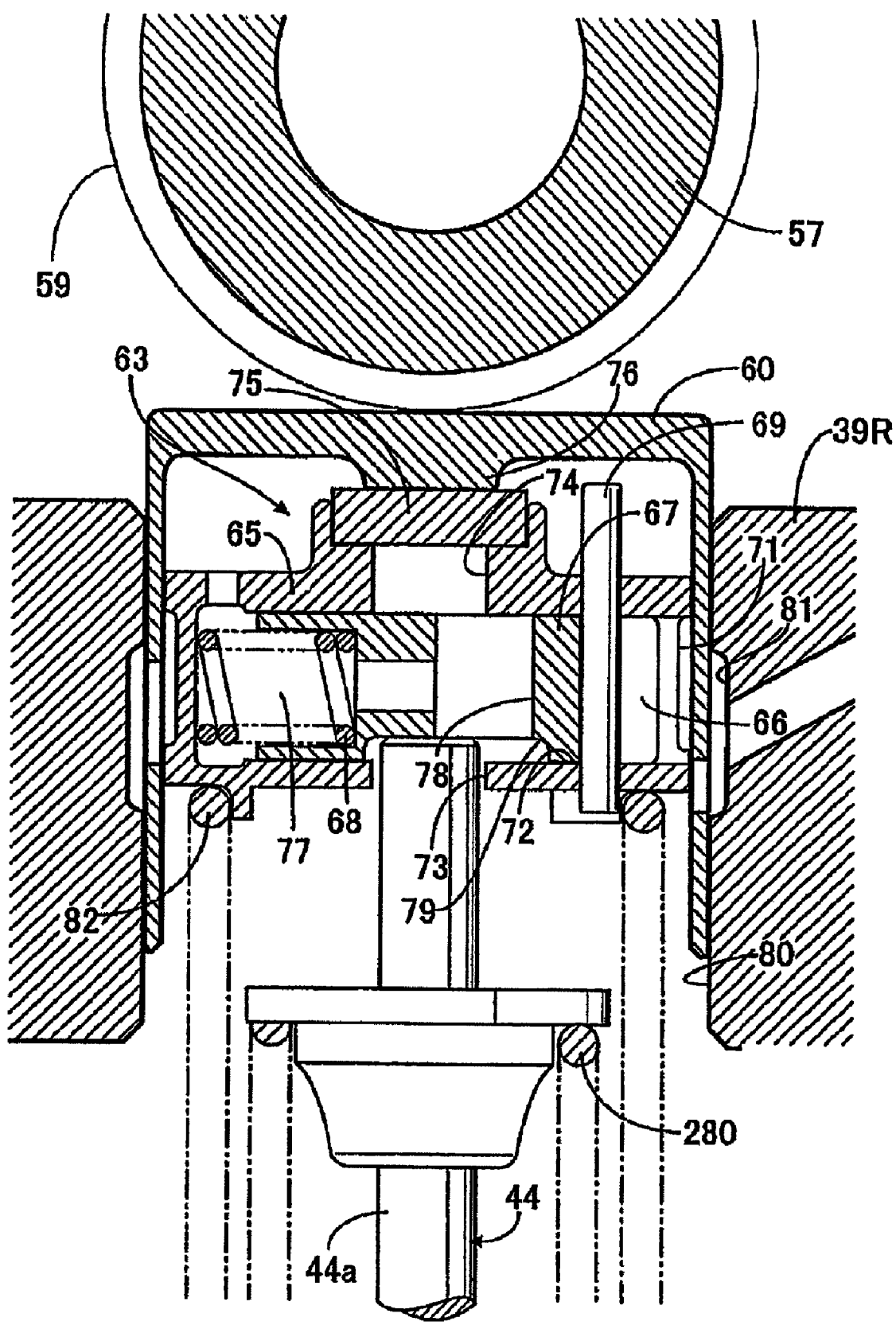
FIG. 8 is an enlarged vertical cross-sectional view of an essential part shown in FIG. 7.

In FIG. 8, the intake-side valve-operation-state changing mechanism 63 is provided in association with the intake-side valve lifters 60. The intake-side valve-operation-state changing mechanism 63 includes a pin holder 65 which is slidably fitted in the intake-side valve lifter 60. A slide pin 67 which forms an oil pressure chamber 66 between the slide pin 67 and an inner surface of the intake-side valve lifter 60 is slidably fitted in the pin holder 65. A return spring 68 which is arranged between the slide pin 67 and the pin holder 65 while exhibiting a spring force for biasing the slide pin 67 in the direction that a volume of the oil pressure chamber 66 is reduced. A stopper pin 69 which is arranged between the pin holder 65 and the slide pin 67 for preventing the rotation of the slide pin 67 about an axis of the slide pin 67.

An annular groove 71 is formed in an outer periphery of the pin holder 65, and a bottomed slide hole 72 which has one end thereof opened at the annular groove 71 and another end thereof closed is formed in the pin holder 65 while having an axis orthogonal to an axis of the intake-side valve lifter 60. Further, an insertion hole 73 through which a distal end portion of a stem 44a of the intake valve 44 which is biased in the valve closing direction by the valve spring 280 is inserted and an extending hole 74 which sandwiches the slide hole 72 with the insertion hole 73 are coaxially formed in the pin holder 65, wherein these holes can house the distal end portion of the stem 44a of the intake valve 44. A disc-like shim 75 which closes an end portion of the extending hole 74 on a closed end side of the intake-side valve lifter 60 is fitted in the pin holder 65. A projecting portion 76 which is brought into contact with the shim 75 is integrally formed on a center portion of an inner surface of a closed-end of the intake-side valve lifter 60.

The slide pin 67 is slidably fitted in the slide hole 72 of the pin holder 65. The oil pressure chamber 66 which is connected with the annular groove 71 is formed between one end of the slide pin 67 and the inner surface of the intake-side valve lifter 60. The return spring 68 is housed in the inside of a spring chamber 77 formed between another end of the slide pin 67 and a closed end of the slide hole 72.

In an axially intermediate portion of the slide pin 67, a housing hole 78 which is allowed to be coaxially connected with the insertion hole 73 and the extending hole 74 is formed in a state that the housing hole 78 can house a distal end portion of the stem 44a. An end portion of the housing hole 78 on a side of the insertion hole 73 is opened at a flat contact surface 79 formed on an outer surface of a lower portion of the slide pin 67 while opposedly facing the insertion hole 73. Further, the contact surface 79 is formed along the axial direction of the slide pin 67 in a relatively elongated manner, and the housing hole 78 is opened at a portion of the contact surface 79 on a side of the oil pressure chamber 66.

The slide pin 67 as described above slides in the axial direction such that an oil pressure force which acts on one end side of the slide pin 67 due to the oil pressure in the oil pressure chamber 66 and a spring force which acts on another end side of the slide pin 67 due to the return spring 68 attain a balance therebetween. When the power unit is in a non-operation state in which the oil pressure in the oil pressure chamber 66 is low, the slide pin 67 is moved to a right side in FIG. 8 so as to bring the distal end of the stem 44a into contact with the contact surface 79 by displacing the axis of housing hole 78 from the axis of the insertion hole 73 and the extending hole 74. When the power unit is in an operation state in which the oil pressure in the oil pressure chamber 66 becomes high, the slide pin 67 is moved to a left side in FIG. 8 so as to allow the housing hole 78 and the extending hole 74 to house the distal end portion of the stem 44a which is inserted in the insertion hole 73.

Further, when the slide pin 67 is moved to a position where the housing hole 78 of the slide pin 67 is coaxially connected with the insertion hole 73 and the extending hole 74, the intake-side valve lifter 60 is slid due to a pushing force applied from the intake-side cam 59 so that the pin holder 65 and the slide pin 67 are also moved to an intake valve 44 side together with the intake-side valve lifter 60 corresponding to the sliding of the intake-side valve lifter 60. However, the distal end portion of the stem 44a is merely housed in the housing hole 78 and the extending hole 74, there is no possibility that a pushing force in the valve-opening direction is applied to the intake valve 44 from the intake-side valve lifter 60 and the pin holder 65, and the intake valve 44 keeps a resting state. Further, when the slide pin 67 is moved to a position where the distal end portion of the stem 44a is brought into contact with the contact surface 79 of the slide pin 67, along with the movement of the pin holder 65 and the slide pin 67 toward the intake valve 44 side corresponding to the sliding of the intake-side valve lifter 60 due to the pushing force applied from the intake-side valve-operating cam 59, a pushing force in the valve-opening direction is applied to the intake valve 44. Thus, the intake valve 44 is opened and closed corresponding to the rotation of the intake-side cam 59.

Support holes 80 in which the intake-side valve lifters 60 are fitted are formed in the rear cylinder head 39R so as to slidably support the intake-side valve lifters 60, and annular recessed portions 81 which are communicated with the annular groove 71 of the pin holder 65 irrespective of the sliding of the intake-side valve lifters 60 in the inside of the support holes 80 are formed in inner surfaces of the support holes 80 so as to surround the intake-side valve lifters 60. Further, springs 82 which bias the intake-side valve lifters 60 in the direction that the intake-side valve lifters 60 are brought into contact with the intake-side cam 59 are arranged between the intake-side valve lifters 60 . . . and the rear cylinder head 39R.

The exhaust-side valve-operation-state changing mechanism 64 is constituted in the same manner as the intake-side valve-operation-state changing mechanism 63 and is provided in association with the exhaust-side valve lifters 62. The exhaust-side valve-operation-state changing mechanism 64 can change over an operation state of the exhaust valve 45 between a state in which the exhaust valve 45 is brought into a closed-valve resting state when a high oil pressure applied to the exhaust-side valve-operation-state changing mechanism 64 and a state in which the exhaust valve 45 is brought into an open-close operation state when an oil pressure applied to the exhaust-side valve-operation-state changing mechanism 64 is reduced.

That is, the rear-bank-side valve-operation device 48R can change over a valve-operation state between a state in which the intake valves 44 and the exhaust valves 45 of two cylinders of the rear bank BR are brought into an open-close operation state and a state in which the cylinders assume a resting state by bringing the intake valves 44 and the exhaust valves 45 of two cylinders of the rear bank BR into a closed-valve resting state due to an operation control of the intake-side valve-operation-state changing mechanism 63 and the exhaust-side valve-operation-state changing mechanism 64.

To explain the constitution by returning to FIG. 4, a generator 84 is joined to a left end portion of the crankshaft 36 in a state that the engine body 33 is mounted on the vehicle body frame F. The generator 84 is constituted of a rotor 85 which is fixed to the crankshaft 36 and a stator 86 which is fixedly arranged in the rotor 85. Further, the generator 84 is housed in a generator-housing chamber 88 which is constituted of the crankcase 35 and a generator cover 87 joined to a left side surface of the crankcase 35, and the stator 86 is fixed to the generator cover 87.

Further, a gear 90 is joined to the rotor 85 by way of a one-way clutch 89 which allows the power transmission toward the rotor 85 side, and power from a starter motor; not shown in the drawing, is transmitted to the gear 90.

On the other hand, to a right side surface of the crankcase 35 in a state that the engine body 33 is mounted on the vehicle body frame F, that is, to a side surface of the crankcase 35 on a side opposite to the side stand 34 in the width direction of the vehicle body frame F, a clutch cover 92 which forms a clutch chamber 91 between the clutch cover 92 and the crankcase 35 is joined. In the inside of the clutch chamber 91, drive sprocket wheels 93, 94 are fixedly mounted on the crankshaft 36. One drive sprocket wheel 93 constitutes a portion of a front-bank-side timing power transmission mechanism 95 which transmits rotational power of the crankshaft 36 to the cam shaft 49 of the front-bank-side valve-operation device 48F with a ½ reduction gear ratio. The front-bank-side timing power transmission mechanism 95 is constituted by wrapping an endless cam chain 97 around the drive sprocket wheel 93 and a driven sprocket wheel 96 mounted on the cam shaft 49. Further, another drive sprocket wheel 94 constitutes a portion of a rear-bank-side timing power transmission mechanism 98 which transmits rotational power of the crankshaft 36 to the intake-side and exhaust-side cam shafts 57, 58 of the rear-bank-side valve-operation device 48R with a ½ reduction gear ratio. The rear-bank-side timing power transmission mechanism 98 is constituted by wrapping an endless cam chain 99 around the drive sprocket wheel 94 and driven sprocket wheels 282 (see FIG. 6) respectively mounted on the intake-side and exhaust-side cam shafts 57, 58.

Further, in the front cylinder block 38F and the front cylinder head 39F, a cam chain chamber 100F is formed for allowing the cam chain 97 to travel therein. In the rear cylinder block 38R and the rear cylinder head 39R, a cam chain chamber 100R is formed for allowing the cam chain 99 to travel therein.

Figure 9:
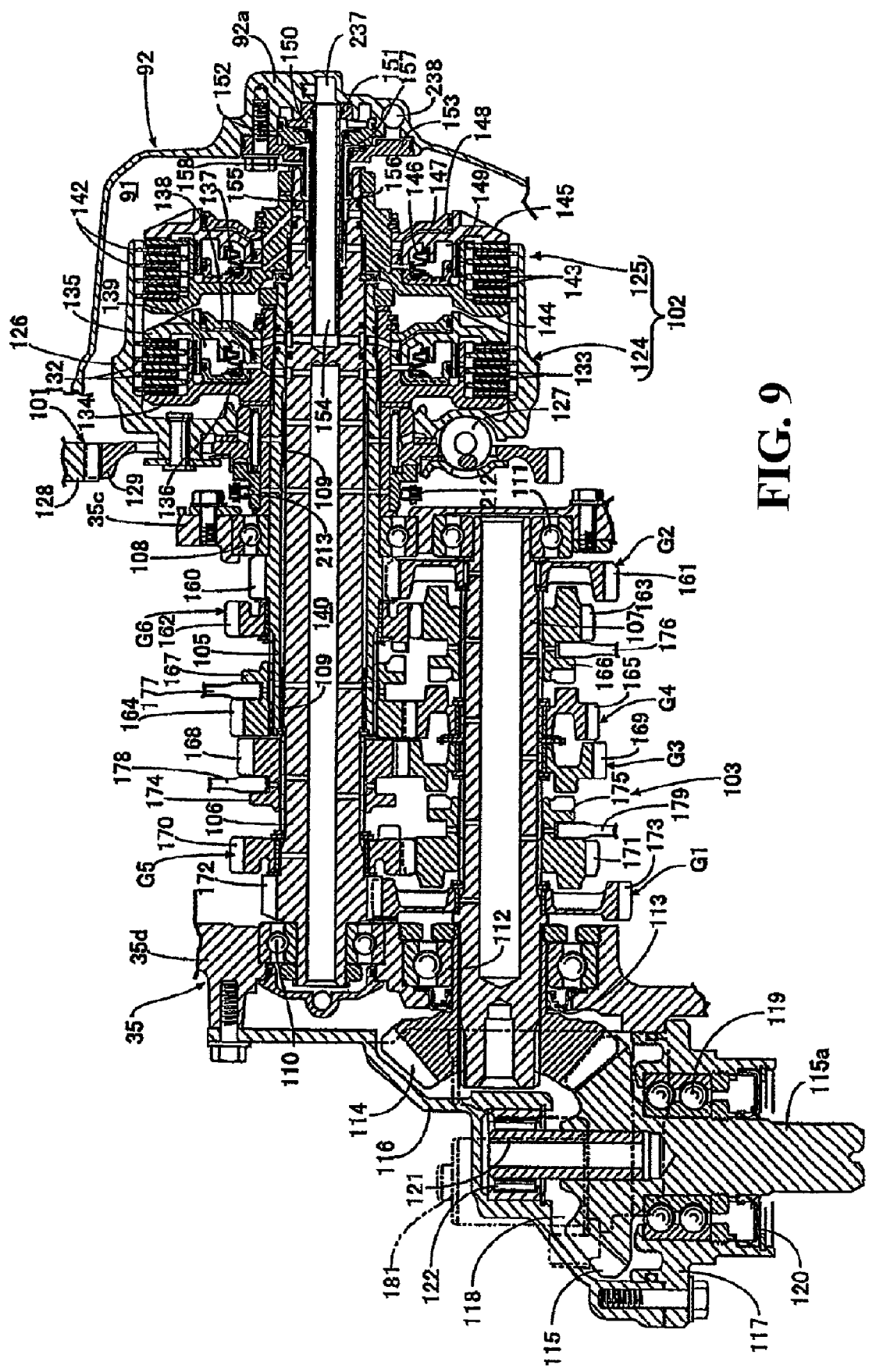
FIG. 9 is a vertical cross-sectional view of a gear transmission mechanism and a clutch device.

To explain the constitution by also referring to FIG. 9, a power transmission path between the crankshaft 36 and the rear wheel WR includes a first speed-reduction device 101, a clutch device 102, a transmission 103, and the drive shaft 32 (see FIG. 1) in order from the crankshaft 36 side. The first speed-reduction device 101 and the clutch device 102 are housed in the clutch chamber 91, and the transmission 103 is housed in the inside of the crankcase 35.

The transmission 103 is a gear transmission which includes selectively establishable gear trains in a plurality of shifting stages, for example, gear trains G1, G2, G3, G4, G5 and G6 for first to sixth shifting stages, and is housed in the inside of the crankcase 35. Here, the gear trains G2, G4, G6 for the second, fourth and sixth shifting stages are arranged between a first main shaft 105 and a counter shaft 107, while the gear trains G1, G3, G5 for the first, third and fifth shifting stages are arranged between a second main shaft 106 which coaxially penetrates the first main shaft 105 in a relatively rotatable manner and the counter shaft 107.

The crankcase 35 includes a pair of side walls 35c, 35d oppposedly facing each other with a distance therebetween in the direction along an axis of the crankshaft 36. An intermediate portion of the first main shaft 105 which is formed in a cylindrical shape while having an axis parallel to the crankshaft 36 rotatably penetrates the side wall 35c, and a ball bearing 108 is interposed between the side wall 35c and the first main shaft 105. Further, the second main shaft 106 having an axis parallel to the crankshaft 36 penetrates the first main shaft 105 in a relatively rotatable manner while keeping a position thereof relative to the first main shaft 105 in the axial direction. A plurality of needle bearings 109 is interposed between the first main shaft 105 and the second main shaft 106. Further, another end portion of the second main shaft 106 is rotatably supported on the side wall 35d of the crankcase 35 by way of a ball bearing 110.

One end portion of the counter shaft 107 having an axis parallel to the crankshaft 36 is rotatably supported on the side wall 35c by way of a ball bearing 111, another end portion of the counter shaft 107 rotatably penetrates the side wall 35d in a state that a ball bearing 112 and an annular sealing member 113 are interposed between the counter shaft 107 and the side wall 35d. A drive bevel gear 114 is fixed to a projecting end portion of the counter shaft 107 which projects from the side wall 35d. A driven bevel gear 115 which has a rotation axis thereof extending in the longitudinal direction of the motorcycle is meshed with the drive bevel gear 114.

Here, the drive bevel gear 114 and the driven bevel gear 115 are meshed with each other in the inside of a gear chamber 118 which is defined by a first gear cover 116 which is detachably joined to the side wall 35d while covering a portion of the side wall 35d of the crankcase 35, a second gear cover 117 which is detachably joined to the first gear cover 116, and the side wall 35d. A shaft portion 115a which is coaxially formed on the driven bevel gear 115 penetrates the second gear cover 117 in a rotatable manner, and a ball bearing 119 and an annular sealing member 120 which is positioned outside the ball bearing 119 are interposed between the shaft portion 115a and the second gear cover 117. Further, one end portion of a support shaft 121 is fitted in the driven bevel gear 115, and another end portion of the support shaft 121 is rotatably supported on the first gear cover 116 by way of a roller bearing 122. Further, the shaft portion 115a is joined to the drive shaft 32.

Figure 10:
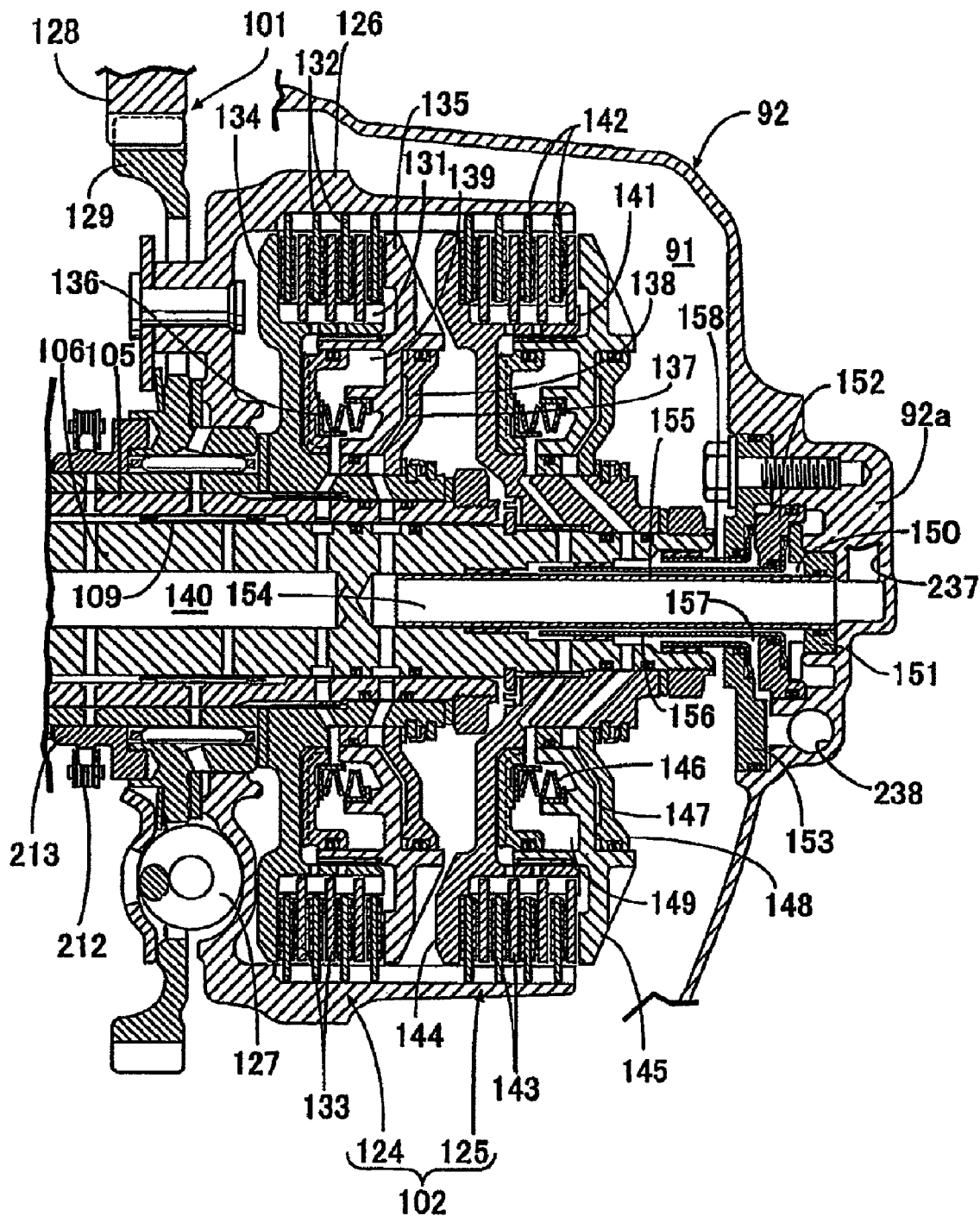
FIG. 10 is an enlarged view of an essential part shown in FIG. 9.

To explain the constitution by also referring to FIG. 10, the clutch device 102 is of a twin type which includes first and second clutches 124, 125 arranged between the transmission 103 and the crankshaft 36. The first clutch 124 is arranged between the crankshaft 36 and one end portion of the first main shaft 105, and the second clutch 125 is arranged between the crankshaft 36 and one end portion of the second main shaft 106. Further, power from the crankshaft 36 is inputted to a clutch outer 126 which is provided to the first and second clutches 124, 125 in common by way of the first speed-reduction device 101 and a damper spring 127.

The first speed-reduction device 101 is constituted of a drive gear 128 which is mounted on the crankshaft 36 outside the drive sprocket wheel 94 and a driven gear 129 which is relatively rotatably supported on the first main shaft 105 and is meshed with the drive gear 128. The driven gear 129 is joined to the clutch outer 126 by way of the damper spring 127.

A pulser 268 is mounted on a shaft end of the crankshaft 36 outside the first speed-reduction device 101, and a rotational-speed detector 269 which detects a rotational speed of the crankshaft 36 by detecting the pulser 268 is mounted on an inner surface of the clutch cover 92. Further, although an inspection hole 270 for inspecting the pulser 268 is formed in the clutch cover 92, the inspection hole 270 is formed in the clutch cover 92 in a state that the inspection hole 270 is offset from an axis of the crankshaft 36 for decreasing a diameter of the inspection hole 270 as much as possible, and the inspection hole 270 is closed by a detachable lid member 271.

The first clutch 124 includes the clutch outer 126, a first clutch inner 131 which is concentrically surrounded by the clutch outer 126 and is joined to the first main shaft 105 in a state that the relative rotation between the first clutch inner 131 and the first main shaft 105 is not allowed. A plurality of sheets of first friction discs 132 which are engaged with the clutch outer 126 in a state that the relative rotation between the first friction discs 132 and the clutch outer 126 is not allowed. A plurality of sheets of second friction discs 133 which are engaged with the first clutch inner 131 in a state that the relative rotation between the second function discs 133 and the first clutch inner 131 is not allowed and are alternately arranged with the first friction discs 132. A first pressure receiving plate 134 which is mounted on the first clutch inner 131 while opposedly facing the first and second friction discs 132, 133 which are arranged in an overlapped manner. A first piston 135 sandwiches the first and second friction discs 132, 133 in a cooperative manner with the first pressure receiving plate 134. A first spring 136 biases the first piston 135.

A back surface of the first piston 135 faces a first oil pressure chamber 137, the first oil pressure chamber 137 is defined between an end wall member 138 and the first piston 135, and the end wall member 138 is fixedly mounted on the first clutch inner 131. The first piston 135 is operated so as to clamp the first and second friction discs 132, 133 between the first piston 135 and the first pressure receiving plate 134 corresponding to the increase of oil pressure in the first oil pressure chamber 137. Due to such an operation, the first clutch 124 can assume a connection state in which the first clutch 124 transmits power which is transmitted to the clutch outer 126 from the crankshaft 36 to the first main shaft 105. Further, a canceller chamber 139 which a front surface of the first piston 135 faces is defined between the first clutch inner 131 and the first piston 135. The first spring 136 is housed in the canceller chamber 139 in a state that the first spring 136 exerts a spring force in the direction that a volume of the first oil pressure chamber 137 is reduced.

Further, the canceller chamber 139 is communicated with a first oil passage 140 which is concentrically formed in the second main shaft 106 for supplying oil to respective lubrication portions of the transmission 103 and to a gap between the first and second main shafts 105, 106. Accordingly, even when a centrifugal force generated along with the rotation of the main shafts 105, 106 acts on the oil in the first oil pressure chamber 137 which is in a pressure-reduced state thus generating a force for pushing the first piston 135, a centrifugal force also acts on the oil in the canceller chamber 139 in the same manner as described above. Accordingly, it is possible to prevent the first piston 135 from undesirably moving in the direction that the first piston 135 clamps the first and second friction discs 132, 133 between the first piston 135 and the first pressure receiving plate 134.

The second clutch 125 is arranged parallel to the first clutch 124 in the direction along an axis of the second main shaft 106 so as to sandwich the first clutch 124 between the second clutch 125 and the first speed reduction device 101. The second clutch 125 includes the clutch outer 126, a second clutch inner 141 which is concentrically surrounded by the clutch outer 126 and is joined to the second main shaft 106 in a state that the relative rotation between the second clutch inner 141 and the second main shaft 106 is not allowed, a plurality of third friction discs 142 which are engaged with the clutch outer 126 in a state that the relative rotation between the third friction discs 142 and the clutch outer 126 is not allowed, a plurality of fourth friction discs 143 which are engaged with the second clutch inner 141 in a state that the relative rotation between the fourth friction discs 143 and the second clutch inner 141 is not allowed and are alternately arranged with the third friction discs 142, a second pressure receiving plate 144 which is mounted on the second clutch inner 141 while opposedly facing the third and fourth friction discs 142, 143 which are arranged in an overlapped manner, a second piston 145 which sandwiches the third and fourth friction discs 142, 143 in a cooperative manner with the second pressure receiving plate 144, and a second spring 146 which biases the second piston 145.

A back surface of the second piston 145 faces a second oil pressure chamber 147, the second oil pressure chamber 147 is defined between an end wall member 148 and the second piston 145, and the end wall member 148 is fixedly mounted on the second clutch inner 141. The second piston 145 is operated so as to clamp the third and fourth friction discs 142, 143 between the second piston 145 and the second pressure receiving plate 144 corresponding to the increase of oil pressure in the second oil pressure chamber 147. Due to such an operation, the second clutch 125 is brought into a connection state in which the second clutch 125 transmits the power which is transmitted to the clutch outer 126 from the crankshaft 36 to the second main shaft 106. Further, a canceller chamber 149, which a front surface of the second piston 145, faces is defined between the second clutch inner 141 and the second piston 145, and the second spring 146 is housed in the canceller chamber 149 in a state that the second spring 146 exerts a spring force in the direction that a volume of the second oil pressure chamber 147 is reduced.

Further, the canceller chamber 149 is communicated with a second oil passage 150 described later. Accordingly, even when a centrifugal force generated along with the rotation of the main shafts 105, 106 acts on the oil in the second oil pressure chamber 147 in a pressure-reduce state thus generating a force which pushes the second piston 145, a centrifugal force also acts on the oil in the canceller chamber 149 in the same manner as described above. Accordingly, it is possible to prevent the second piston 145 from undesirably moving in the direction that the second piston 145 clamps the third and fourth friction discs 142, 143 between the second piston 145 and the second pressure receiving plate 144.

On an inner surface side of the clutch cover 92 which covers the first and second clutches 124, 125 in order from a right side as viewed in the traveling direction of the motorcycle, first, second and third partition wall members 151, 152 and 153 are mounted. Further, a first cylindrical member 155 which forms a first oil passage 154 communicated with the first oil-pressure chamber 137 of the first clutch 124 is arranged between the second main shaft 106 and the first partition wall member 151. A second cylindrical member 156 which forms an annular second oil passage 150 communicated with the canceller chamber 149 of the second clutch 125 between the second cylindrical member 156 and the first cylindrical member 155 and concentrically surrounds the first cylindrical member 155 is arranged between the second main shaft 106 and the second partition wall member 152. A third cylindrical member 158 which forms an annular second oil passage 157 communicated with the second oil-pressure chamber 147 between the third cylindrical member 158 and the second cylindrical member 156 and concentrically surrounds the second cylindrical member 156 is arranged between the second main shaft 106 and the third partition wall member 153.

To explain the constitution by returning to FIG. 9 again, the fourth-shift gear train G4, the sixth-shift gear train 66 and the second-shift gear train G2 are sequentially arranged parallel to each other between the first main shaft 105 and the counter shaft 107 of the transmission 103 in order from a side opposite to the clutch device 102. The second-shift gear train G2 is constituted of a second-shift drive gear 160 which is integrally formed with the first main shaft 105 and a second-shift driven gear 161 which is relatively rotatably supported on the counter shaft 107 and is meshed with the second-shift drive gear 160. The sixth shift gear train G6 is constituted of a sixth-shift drive gear 162 which is relatively rotatably supported on the first main shaft 105 and a sixth-shift driven gear 163 which is supported on the counter shaft 107 in an axially movable manner but in a relatively non-rotatable manner with respect to the counter shaft 107 and is meshed with the sixth-shift drive gear 162. The fourth-shift gear train G4 is constituted of a fourth-shift drive gear 164 which is supported on the first main shaft 105 in an axially movable manner but in a relatively non-rotatable manner with respect to the first main shaft 105 and a fourth-shift driven gear 165 which is relatively rotatably supported on the counter shaft 107 and is meshed with the fourth-shift drive gear 164.

Between the second-shift driven gear 161 and the fourth-shift driven gear 165, a first shifter 166 is supported on the counter shaft 107 in an axially movable manner but in a relatively non-rotatable manner with respect to the counter shaft 107. The first shifter 166 can change over a gear engaging mode among a state in which the first shifter 166 is engaged with the second-shift driven gear 161, a state in which the first shifter 166 is engaged with the fourth-shift driven gear 165, and a state in which the first shifter 166 is engaged with neither the second-shift driven gear 161 nor the fourth-shift driven gear 165. The sixth-shift driven gear 163 is integrally formed with the first shifter 166. Further, the fourth-shift drive gear 164 is integrally mounted on a second shifter 167 which is supported on the first main shaft 105 in an axially movable manner but in a relatively non-rotatable manner with respect to the first main shaft 105, and the second shifter 167 is capable of changing over a state between an engaging state and a disengaging state with the sixth-shift drive gear 162.

Further, by engaging the first shifter 166 with the second-shift driven gear 161 in a state that the second shifter 167 is not engaged with the sixth-shift drive gear 162, the second-shift gear train G2 is established. By engaging the first shifter 166 with the fourth-shift driven gear 165 in a state that the second shifter 167 is not engaged with the sixth-shift drive gear 162, the fourth shift gear train 64 is established. By engaging the second shifter 167 with the sixth-shift drive gear 162 in a state that the first shifter 166 is in a neutral state, the sixth shift gear train G6 is established.

Between the projecting portion of the second main shaft 106 which projects from another end portion of the first main shaft 105 and the counter shaft 107, the first-shift gear train G1, the fifth-shift gear train G5 and the third-shift gear train G3 are sequentially arranged parallel to each other in order from a side opposite to the clutch device 102. The third-shift gear train G3 is constituted of a third-shift drive gear 168 which is supported on the second main shaft 106 in an axially movable manner but in a relatively non-rotatable manner with respect to the second main shaft 106 and a third-shift driven gear 169 which is relatively rotatably supported on the counter shaft 107 and is meshed with the third-shift drive gear 168. The fifth-shift gear train G5 is constituted of a fifth-shift drive gear 170 which is relatively rotatably supported on the second main shaft 106 and a fifth-shift driven gear 171 which is supported on the counter shaft 107 in an axially movable manner but in a relatively non-rotatable manner with respect to the counter shaft 107 and is meshed with the fifth-shift drive gear 170. The first-shift gear train G1 is constituted of a first-shift drive gear 172 which is integrally formed with the second main shaft 106 and a first-shift driven gear 173 which is relatively rotatably supported on the counter shaft 107 and is meshed with the first-shift drive gear 172.

The third-shift drive gear 168 is integrally mounted on a third shifter 174 which is supported on the second main shaft 106 in an axially movable manner but in a relatively non-rotatable manner with respect to the second main shaft 106, and the third shifter 174 can change over a shift state between an engaging state and a disengaging state with the fifth-shift drive gear 170. Between the third-shift driven gear 169 and the first-shift driven gear 173, a fourth shifter 175 is supported on the counter shaft 107 in an axially movable manner but in a relatively non-rotatable manner with respect to the counter shaft 107. The fourth shifter 175 can change over a shift state among a state in which the fourth shifter 175 is engaged with the third-shift driven gear 169, a state in which the fourth shifter 175 is engaged with the first-shift driven gear 173, and a neutral state in which the fourth shifter 175 is engaged with neither the third-shift driven gear 169 nor the first-shift driven gear 173. The fifth-shift driven gear 171 is integrally formed with the fourth shifter 175.

Further, by engaging the fourth shifter 175 with the first-shift driven gear 173 in a state that the third shifter 174 is not engaged with the fifth-shift drive gear 170, the first shift gear train G1 is established. By engaging the fourth shifter 175 with the third-shift driven gear 169 in a state that the third shifter 174 is not engaged with the fifth-shift drive gear 170, the third-shift gear train G3 is established. By engaging the third shifter 174 with the fifth-shift drive gear 170 in a state that the fourth shifter 175 is in a neutral state, the fifth-shift gear train G5 is established.

The first to fourth shifters 166, 167, 174, 175 are rotatably held by first to fourth shift forks 176, 177, 178, 179, and these shift forks 176 to 179 are driven in the axial directions of both main shafts 105, 106 and the counter shaft 107. Thus, the first to fourth shifters 166, 167, 174, 175 are operated in the axial direction.

A shift drum (not shown in the drawing) which engages the respective shift forks 176 to 179 with an outer periphery thereof is rotatably driven with power generated by a shift-driving electrically-operated motor 181 which constitutes a shift actuator. The shift-driving electrically-operated motor 181 is mounted on a side surface of the crankcase 35. In this embodiment, the motor 181 is mounted on either one of left and right side surfaces, for example, on the left side surface of the crankcase 35 in a state that the engine body 33 is mounted on the vehicle body frame F. Further, the first and second gear covers 116, 117 are detachably mounted on the left side surface of the crankcase 35 so as to cover a shaft end of the counter shaft 107 in the transmission 103, and the shift-driving electrically-operated motor 181 is arranged above the first and second gear covers 116, 117 and in the inside of outer ends of the first and second gear covers 116, 117 arranged along the axis of the counter shaft 107. Further, the generator cover 87 is mounted on the left side surface of the crankcase 35, and the shift-driving electrically-operated motor 181 is arranged behind the generator cover 87 as shown in FIG. 2.

Further, as shown in FIG. 2, the shift-driving electrically-operated motor 181 is mounted on the left side surface of the crankcase 35 in a state that the shift-driving electrically-operated motor 181 has an operational axis thereof, that is, a rotational axis C1 thereof arranged on a plane orthogonal to the axial direction of the transmission 103 and, at the same time, inclined in the vertical direction, in this embodiment, inclined frontwardly and upwardly.

To explain the constitution by focusing on FIG. 2, a water pump 208 is mounted on the left side surface of the crankcase 35 below the generator cover 87. In the inside of the crankcase 35, first and second oil pumps 209, 210 and a scavenging pump 211 are housed coaxially with the water pump 208. The first and second oil pumps 209, 210 and the scavenging pump 211 are rotatably operated together with the water pump 208. Further, to the water pump 208, the first and second oil pumps 209, 210 and the scavenging pump 211, the rotational power from the driven gear 129 of the first speed-reduction device 101 is transmitted by way of an endless chain 212. As shown in FIG. 9 and FIG. 10, a drive sprocket wheel 213 which is engaged with the driven gear 129 is rotatably supported on the first main shaft 105, and the chain 212 is wrapped around the driven sprocket wheel 214 which is joined to the water pump 208, the first and second oil pumps 209, 210 and the scavenging pump 211 in common and the drive sprocket wheel 213.

Figure 11:
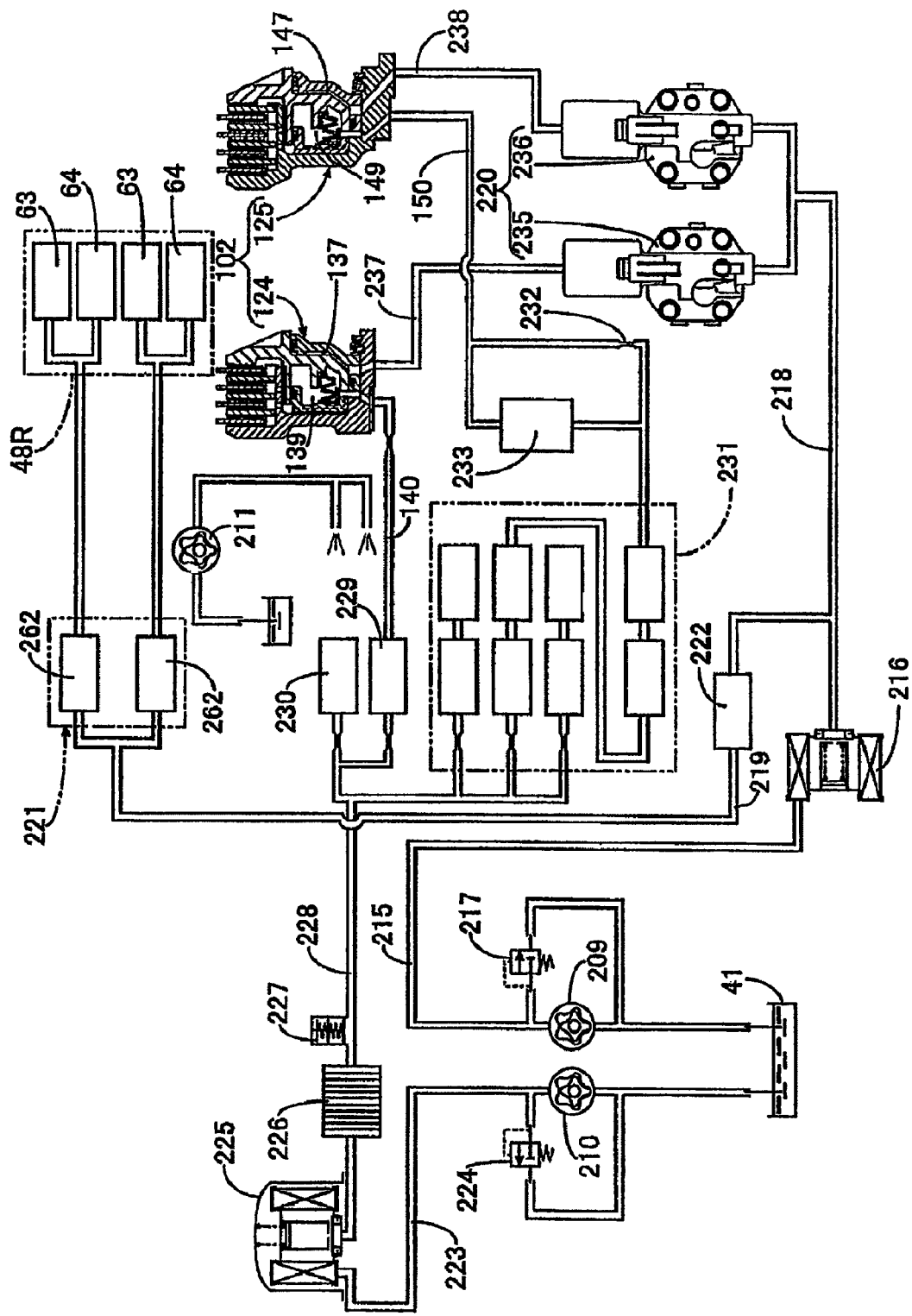
FIG. 11 is a system diagram showing the constitution of a hydraulic system.

In FIG. 11, the first oil pump 209 discharges an oil pressure for changing over engagement and disengagement of the first and second clutches 124, 125 of the clutch device 102 and, at the same time, for performing a changeover of an operation of the intake-side valve-operation-state changing mechanism 63 and an operation of the exhaust-side valve-operation-state changing mechanism 64 of the rear-bank-side valve-operation device 48R. Oil which is sucked from the oil pan 41 and is discharged from the first oil pump 209 is fed to a first oil filter 216 by way of an oil passage 215, and a relief valve 217 is connected to the oil passage 215. Further, oil which is purified by the first oil filter 216 flows in bifurcated oil passages, that is, first and second branched oil passages 218, 219. The first branched oil passage 218 is connected to a clutch control device 220 provided for changing over engagement and disengagement of the clutch device 105, and the second branched oil passage 219 is connected to a valve-operating oil-pressure control device 221 provided for changing over an operation of the intake-side valve-operation-state changing mechanism 63 and an operation of the exhaust-side valve-operation-state changing mechanism 64 of the rear-bank-side valve-operation device 48R, and a pressure-reducing valve 222 is put in the middle of the second branched oil passage 219.

Further, the second oil pump 210 is provided for supplying lubrication oil to the respective lubrication portions of the engine E. Oil which is sucked from the oil pan 41 and is discharged from the second oil pump 210 is fed to a second oil filter 225 by way of an oil passage 223, and a relief valve 224 is connected to a middle of the oil passage 223. Oil which is purified by the second oil filter 225 is guided to an oil passage 228 in the middle of which an oil cooler 226 is put. A pressure sensor 227 is connected to the oil passage 228.

Oil fed from the oil passage 228 is supplied to a lubrication portion 229 formed around the first and second main shafts 105, 106 of the transmission 103, a lubrication portion 230 formed around the counter shaft 107 of the transmission 103, and a plurality of lubrication portions 231 formed in the engine body 33. Further, oil from the lubrication portion 229 formed around the first and second main shafts 105, 106 is guided to the first oil passage 140 which is communicated with the canceller chamber 137 of the first clutch 124. Further, oil from the lubrication portion 231 is supplied to the second oil passage 150 communicated with the canceller chamber 149 of the second clutch 125 by way of a throttle valve 232. A solenoid-operated open-close valve 233 for smoothly supplying oil to the canceller chamber 149 is connected to the throttle valve 232 in parallel.

Figure 12:
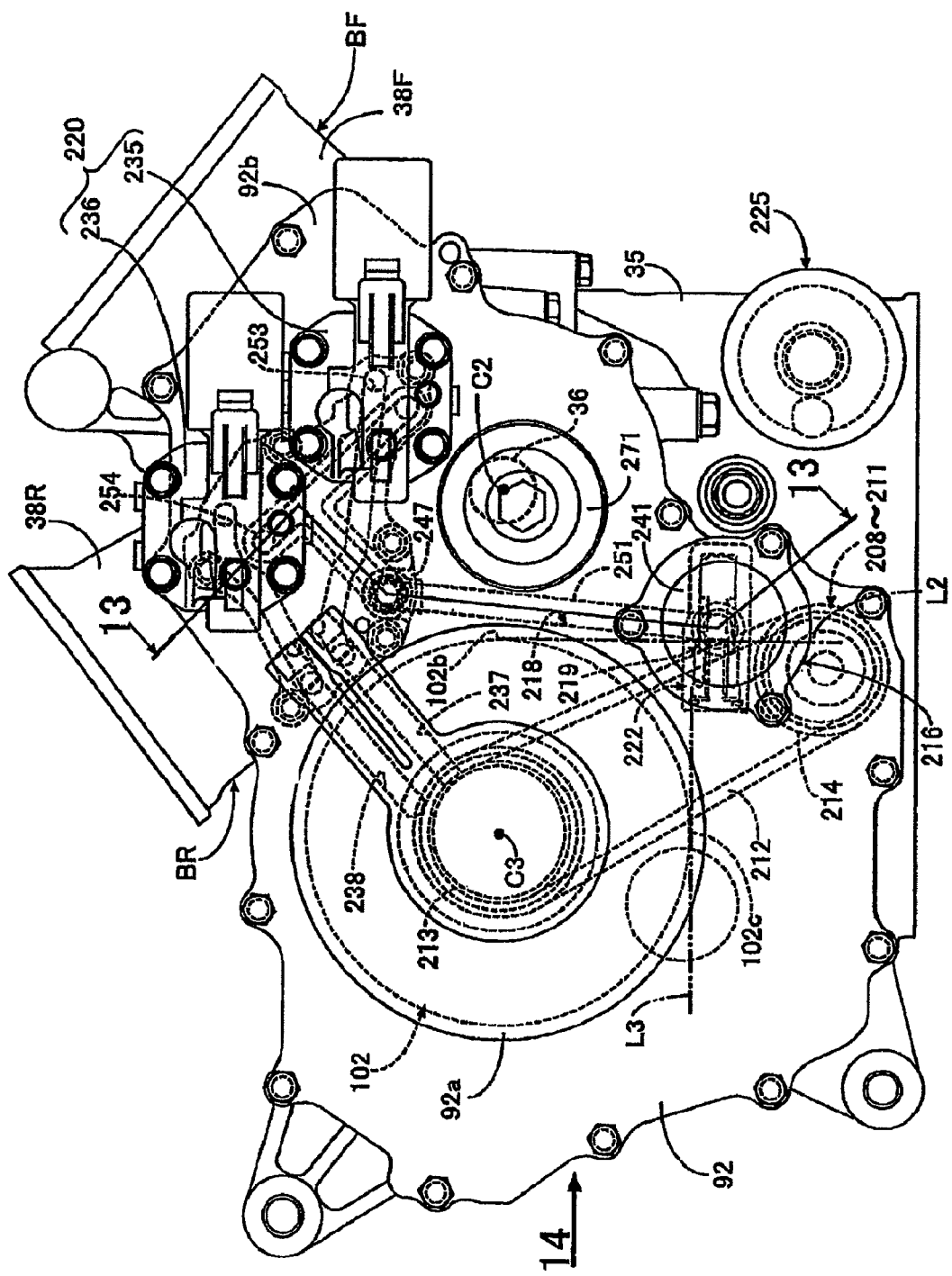
FIG. 12 is an enlarged view of an essential part shown in FIG. 3.
Figure 13:
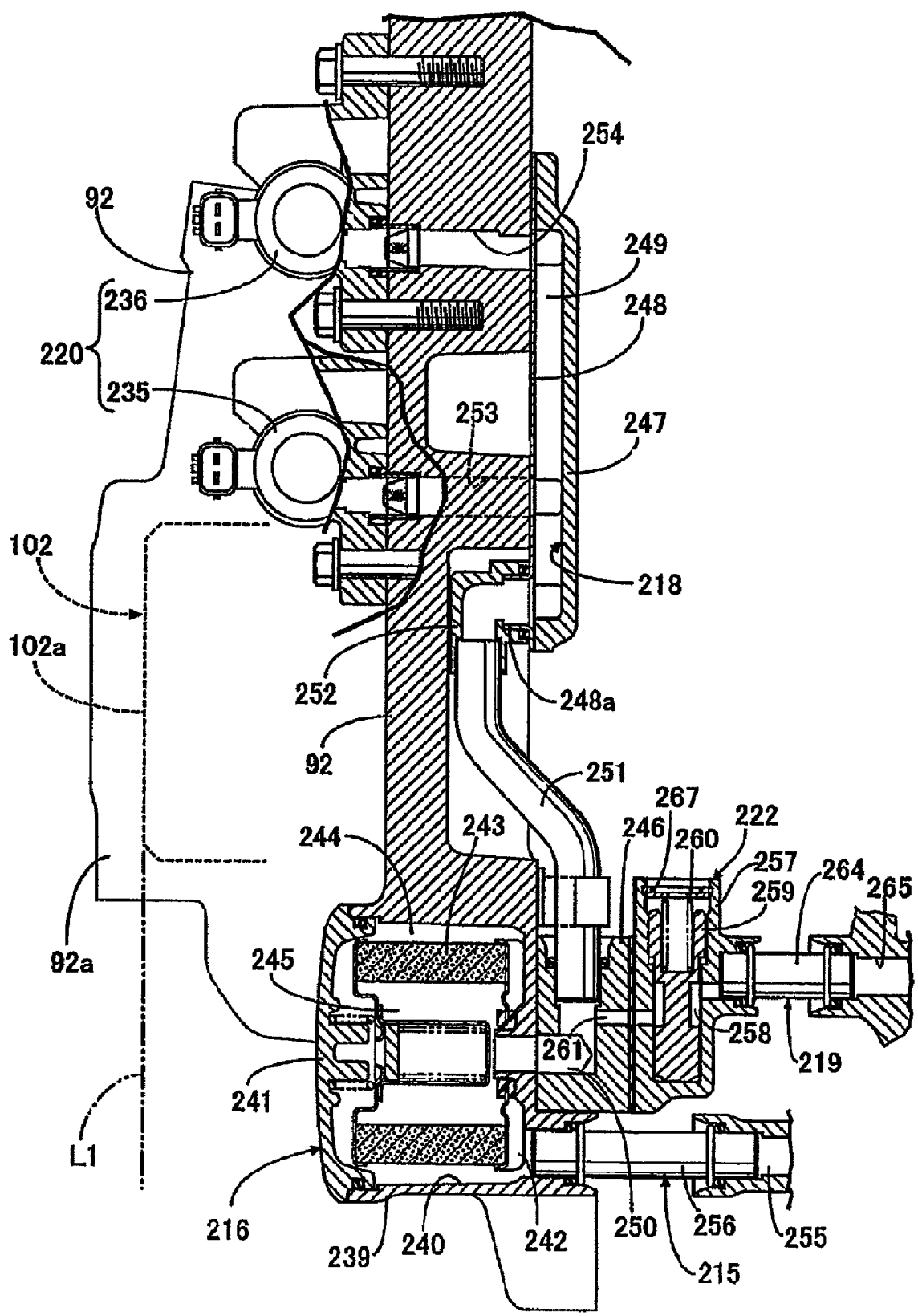
FIG. 13 is an enlarged cross-sectional view taken along a line 13-13 in FIG. 12.

To explain the constitution also in conjunction with FIG. 12 and FIG. 13, the clutch control device 220 is constituted of a first solenoid-operated control valve 235 which changes over a state of oil pressure to the first oil-pressure chamber 137 in the first clutch 124 between an oil-pressure applying state and an oil-pressure releasing state and a second solenoid-operated control valve 236 which changes over a state of oil pressure to the second oil-pressure chamber 147 in the second clutch 125 between an oil-pressure applying state and an oil-pressure releasing state. The clutch control device 220 is mounted on an outer surface of the clutch cover 92 and is arranged on a right side of the front cylinder block 38F of the front bank BF. Further, the clutch control device 220 is also arranged outside the clutch device 102 as viewed in the direction along an axis of the clutch device 102. That is, the clutch cover 92 includes a projecting portion 92a which projects outwardly so as to house the clutch device 102 at a position corresponding to the clutch device 102 and an extending portion 92b which extends to a right side of the front cylinder block 38F from the projecting portion 92a. The clutch control device 220 is mounted on the extending portion 92b.

The first and second solenoid-operated control valves 235, 236 which constitute the clutch control device 220 are, as can be clearly understood from FIG. 12 and FIG. 13, respectively arranged at different positions in the longitudinal direction as well as in the vertical direction of the engine body 33. Further, out of the first and second solenoid-operated control valves 235, 236, the second solenoid-operated control valve 236 is arranged above the first solenoid-operated control valve 235 and above the crankshaft 36, and at least a portion of the first solenoid-operated control valve 235 arranged below the second solenoid-operated control valve 236, in this embodiment, most of the first solenoid-operated control valve 235 is arranged in front of the crankshaft 36. Further, the first and second solenoid-operated control valves 235, 236 are arranged at positions also different from the position of the first oil filter 216 mounted on the clutch cover 92 in the vertical direction of the engine body 33. In this embodiment, the first and second solenoid-operated control valves 235, 236 are arranged above the first oil filter 216.

Figure 14:
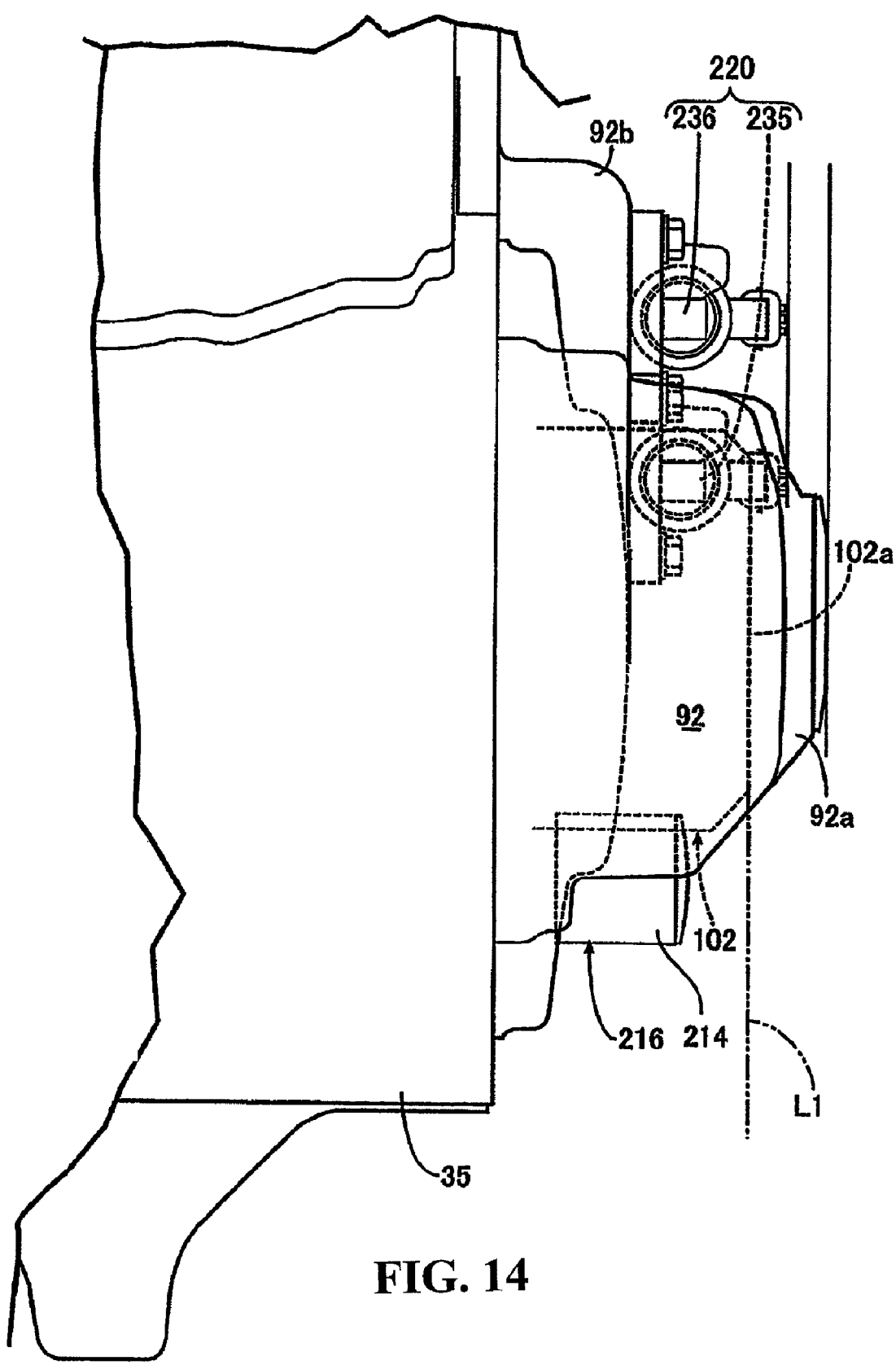
FIG. 14 is a view as viewed in the direction indicated by an arrow 14 in FIG. 12.

Further, as shown in FIG. 14, the clutch control device 220 is mounted on an outer surface of the extending portion 92b of the clutch cover 92 such that the clutch control device 220 is positioned inside an outermost end of the clutch cover 92, that is, a distal end of the above-mentioned projecting portion 92a.

In the clutch cover 92, an oil passage 237 which connects the first oil passage 154 communicated with the first oil-pressure chamber 137 of the first clutch 124 and the first solenoid-operated control valve 235 and an oil passage 238 which connects the second oil passage 157 communicated with the second oil-pressure chamber 147 of the second clutch 125 and the second solenoid-operated control valve 236 are formed.

To explain the constitution by focusing on FIG. 12, the first oil filter 216 is mounted on the clutch cover 92 arranged on a side opposite to the side stand 34 in the width direction of the vehicle body frame F. The first oil filter 216 is mounted on the clutch cover 92 in a detachable manner from the outside in a state that the first oil filter 216 is arranged between an axis C2 of the crankshaft 36 and an axis C3 of the clutch device 102 and below these axes C2, C3.

A filter casing 239 of the first oil filter 216 projects outwardly from the crankcase 35 of the engine body 33. The filter casing 239 is formed into a cylindrical shape so as to form a bottomed housing hole 240 having an outer end thereof opened and is integrally formed with the clutch cover 92. A lid member 241 which closes an outer-end opening portion of the housing hole 240 is fastened to the filter casing 239.

On a support frame 242, which is housed in the filter casing 239 in a state that the support frame 242 is sandwiched between an inner-end closed portion of the housing hole 240 and the lid member 241, a cylindrical filtering material 243 is supported. Further, an annular un-purification chamber 244 is defined around the filtering material 243, and a purification chamber 245 is defined in the inside of the filtering material 243.

Such a first oil filter 216 is arranged below the crankshaft 36 and outside the clutch device 102 as viewed in the direction along the axis C3 of the clutch device 102. In this embodiment, the first oil filter 216 is arranged at a frontward and downward oblique position as viewed from the clutch device 102 as shown in FIG. 12. Here, at least a portion of the filtering material 243 which is a constitutional element of the first oil filter 216 projects outwardly from the outer surface of the clutch cover 92 in the direction along the axis of the crankshaft 36 and, at the same time, the projecting portion is positioned inside an outermost end of the projecting portion 92a of the clutch cover 92.

Further, as can be clearly understood from FIG. 12, the first oil filter 216 is mounted on the clutch cover 92 in a state that a portion of the first oil filter 216 overlaps with the water pump 208, the first and second oil pumps 209, 210 and the scavenging pump 211 as viewed in a side view.

The first oil filter 216 is arranged inside a vertical line L1 which passes through an axially outer end 102a of the clutch device 102 as viewed in the direction orthogonal to the axes C2, C3 of the crankshaft 36 and the clutch device 102 as shown in FIG. 13 and FIG. 14. Further, as shown in FIG. 12, the first oil filter 216 is arranged such that a vertical line L2 which passes through a frontmost end 102b of the clutch device 102 passes through the first oil filter 216 as viewed in a side view in the direction along the axes C2, C3 of the crankshaft 36 and the clutch device 102. Due to such construction, the first oil filter 216 is arranged inside the axially outer end 102a of the clutch device 102 in a state that the first oil filter 102 overlaps with a portion of the clutch device 102 as viewed in a plan view. Further; as shown in FIG. 12, the first oil filter 216 is arranged such that a horizontal line L3 which passes through a lowermost end 102c of the clutch device 102 passes through the first oil filter 216 as viewed in a side view in the direction along the axes of the crankshaft 36 and the clutch device 102. Due to such construction, the first oil filter 216 is arranged so as to overlap with a lower portion of the clutch device 102 as viewed in a front view and a back view, and a portion of the first oil filter 216 is arranged above the lowermost end 102c of the clutch device 102.

A connection member 246 is fastened to an inner surface of the clutch cover 92 at a portion thereof corresponding to the first oil filter 216. On the other hand, an oil-passage forming member 247 is fastened to the inner surface of the clutch cover 92 in the vicinity of the clutch control device 220 with a planar partition wall member 248 sandwiched between the oil-passage forming member 247 and the clutch cover 92, and an oil passage 249 is formed between the oil-passage forming member 247 and the partition wall member 248. Further, the connection member 246 forms a connection oil passage 250 in communication with the purification chamber 245 of the first oil filter 216 therein, and one end of a connection pipe 251 which extends toward an oil-passage-forming member-247 side is hermetically fitted in the connection oil passage 250. Further, another end of the connection pipe 251 is fitted in a joint member 252, and the joint member 252 is hermetically fitted in a cylindrical fitting cylindrical portion 248a formed on the partition wall member 248. Further, oil passages 253, 254 which respectively connect the oil passage 249 formed between the oil-passage forming member 247 and the partition wall member 248 with the first and second solenoid-operated control valves 235, 236 being formed in the clutch cover 92.

Accordingly, the purification chamber 245 of the first oil filter 216 is connected to the connection oil passage 250, the connection pipe 251, the joint member 252, the oil passage 249 and the oil passages 253, 254. The connection oil passage 250, the connection pipe 251, the joint member 252, the oil passage 249 and the oil passages 253, 254 constitute the first branched oil passage 218 explained in conjunction with FIG. 11.

The oil passage 215 which connects the un-purification chamber 244 of the first oil filter 216 and a discharge port of the first oil pump 209 is constituted of an oil passage 255 which is communicated with a discharge port of the first oil pump 209 and is formed in the crankcase 35 and a connection pipe 256 which connects the oil passage 255 and the un-purification chamber 244. Both ends of the connection pipe 256 are hermetically fitted in an end portion of the oil passage 255 and the clutch cover 92 respectively.

In FIG. 13, a valve housing 257 of the pressure-reducing valve 222 is joined to the clutch cover 92 together with the connection member 246 with the connection member 246 sandwiched between the valve housing 257 and the inner surface of the clutch cover 92, and the pressure-reducing valve 222 is mounted on the clutch cover 92. The pressure-reducing valve 222 is configured such that a valve element 259 is slidably fitted in the valve housing 257 so as to form an oil chamber 258 between the valve element 259 and one end of the valve housing 257, and a spring 260, which biases the valve element 259 in the direction that a volume of the oil chamber 258 is reduced is arranged between a spring receiving member 267 formed on another end side of the valve housing 257 and the valve element 259.

Further, a passage 261 which connects the oil passage 250 in the inside of the connection member 246 and the oil chamber 258 is formed in the connection member 246 and the valve housing 257, and the passage 261 becomes a branching point of the first and second branched oil passages 218, 219.

The pressure-reducing valve 222 is provided for reducing an oil pressure in the oil chamber 258 to a fixed value by allowing the back-and-forth sliding of the valve element 259 so as to establish the equilibrium between an oil-pressure force attributed to an oil pressure in the oil chamber 258 and a spring force of the spring 260, and the oil pressure which is reduced by the pressure-reducing valve 222 is guided to a valve-operating-oil-pressure-control-device-221 side.

Due to such an arrangement of the pressure-reducing valve 222, the pressure reducing valve 222 is arranged directly in the vicinity of the first oil filter 216 and, further, as can be clearly understood from FIG. 12, at least a portion of the pressure reducing valve 222 is arranged so as to overlap with the first oil filter 216 as viewed in the axial direction of the first oil filter 216.

The valve-operating oil-pressure control device 221 includes a pair of solenoid-operated control valves 262, 262 which individually corresponds to two respective cylinders of the rear bank BR. The valve-operating oil-pressure control device 221 is mounted on a left side surface of the rear cylinder head 39R of the rear bank BR.

One solenoid-operated control valve 262 is provided for controlling an oil pressure of the intake-side and exhaust-side valve-operation-state changing mechanisms 63, 64 of one cylinder out of two cylinders, and another solenoid-operated control valve 262 is provided for controlling an oil pressure of the intake-side and exhaust-side valve-operation-state changing mechanisms 63, 64 of another cylinder.

Oil whose pressure is reduced by the pressure-reducing valve 222 is guided to the valve-operating oil-pressure control device 221 through a connection pipe 264 which has one end thereof connected to the valve housing 257 and extends toward a side away from the clutch cover 92, an oil passage 265, which is connected to another end of the connection pipe 264 and is formed in the crankcase 35 so as to extend to the left side surface of the crankcase 35, and an oil passage 266 which is arranged on left surface side of the crankcase 35, the rear cylinder block 38R and the rear cylinder head 39R and connects the oil passage 265 and the valve-operating oil-pressure control device 221. The second branched oil passage 219 in the middle of which the pressure reducing valve 222 is put is constituted of the connection pipe 264 and the oil passages 265, 266.

The second oil filter 225 is arranged in front of the first oil filter 216 and is mounted on a right side surface of the crankcase 35.

To explain the manner of operation of this embodiment, the shift-driving electrically-operated motor 181 which performs a drive control of the shifting operation of the transmission 103 is mounted on the left side surface of the crankcase 35. Thus, it is possible to enhance the degree of freedom in layout of functional parts arranged on a periphery of the crankcase 35. Accordingly, a rider can easily access the shift-driving electrically-operated motor 181 from the outside of the power unit P thus enhancing the maintenance property of the shift-driving electrically-operated motor 181. Further, the operational axis C1 of the shift-driving electrically-operated motor 181 is arranged in a plane orthogonal to the axial direction of the transmission 103. Thus, although the shift-driving electrically-operated motor 181 is mounted on the left side surface of the crankcase 35, it is possible to restrict a projection quantity of the shift-driving electrically-operated motor 181 toward the outside from the crankcase 35 as much as possible.

Further, the shaft end of the counter shaft 107 of the transmission 103 is covered with the first and second gear covers 116, 117 which are detachably mounted on the left side surface of the crankcase 35, and the shift-driving electrically-operated motor 181 is mounted on the left side surface of the crankcase 35 in a state that the shift-driving electrically-operated motor 181 is arranged above the first and second gear covers 116, 117 and inside the first and second gear covers 116, 117 in the direction along the axis of the counter shaft 107. Accordingly, with the provision of the first and second gear covers 116, 117, it is possible to protect the shift-driving electrically-operated motor 181 from flying pebbles, muddy water or the like from below the vehicle whereby a part used exclusively for protecting the shift-driving electrically-operated motor 181 becomes unnecessary thus reducing the number of parts. Further, due to such advantageous effects, it is unnecessary to provide bosses or the like for mounting the protective cover around the shift-driving electrically-operated motor 181. Thus, the restriction imposed on layout of other parts attributed to the bosses or the like can be eliminated thus enhancing the degree of freedom in layout of other parts.

Further, although the generator cover 87 is mounted on the left side surface of the crankcase 35, the shift-driving electrically-operated motor 181 is positioned behind the generator cover 87 and inside the outer end of the generator cover 87 arranged along the axis of the crankshaft 36. Thus, it is possible to arrange the shift-driving electrically-operated motor 181 by effectively making use of a space around the generator cover 87 which projects from the left side surface of the crankcase 35 whereby it is possible to prevent the power unit P from becoming large-sized in the direction along the axis of the crankshaft 36 attributed to the arrangement of the shift-driving electrically-operated motor 181. Further, with the provision of the generator cover 87, it is possible to protect the shift-driving electrically-operated motor 181 from flying pebbles, muddy water and the like from a front side of the vehicle. Thus, a part used exclusively for protecting the shift-driving electrically-operated motor 181 becomes unnecessary whereby it is possible to reduce the number of parts. Still further, due to the above-mentioned construction, it is unnecessary to provide bosses or the like for mounting the protective cover on the periphery of the shift-driving electrically-operated motor 181. Thus, the restriction imposed on layout of other parts attributed to the bosses or the like can be eliminated thus enhancing the degree of freedom in layout of other parts.

Further, the operational axis C1 of the shift-driving electrically-operated motor 181 is inclined in the vertical direction. Thus, in mounting the shift-driving electrically-operated motor 181 on the crankcase 35 or dismounting the shift-driving electrically-operated motor 181 from the crankcase 35, the generator cover 87 arranged in front of the shift-driving electrically-operated motor 181 does not obstruct the mounting or dismounting operation and hence, it is possible to enhance the maintenance property.

To the right side surface of the crankcase 35, that is, to the side surface of the crankcase 35 on a side opposite to the side stand 34 in the width direction of the vehicle body frame F, the clutch cover 92 which forms the clutch chamber 91 for housing the clutch device 102 between the clutch cover 92 and the crankcase 35 is joined. Further, the clutch control device 220 which performs a changeover of engagement and disengagement of the clutch device 102 is mounted on the outer surface of the clutch cover 92 in a state that the clutch control device 220 is arranged on a right side of the front cylinder block 38F of the front bank BF. Accordingly, a flow of air easily impinges on the clutch control device 220 thus enhancing the cooling property of the clutch control device 220 and, at the same time, preventing an increase in a longitudinal length of the power unit P. Further, parts of an intake system and constitutional parts of the vehicle such as the vehicle body frame F are arranged on a portion of the crankcase 35 corresponding to the outer surface of the clutch cover 92 are relatively small. Thus, by mounting the clutch control device 220 on the outer surface of the clutch cover 92, it is possible to enhance the degree of freedom in design of the parts of the intake system, the vehicle body frame F and the like.

Further, the clutch device 102 is of a twin-type which includes the first and second clutches 124, 125. The clutch control device 220 also includes the first and second solenoid-operated control valves 235, 236 for individually controlling engagement and disengagement of the first and second clutches 124, 125. Further, the first and second solenoid-operated control valves 235, 236 are arranged at different positions in the longitudinal direction and the vertical direction. Thus, the flow of air easily impinges on the respective first and second solenoid-operated control valves 235, 236 thus enabling the acquisition of excellent cooling property.

Further, with respect to the first and second solenoid-operated control valves 235, 236, the second solenoid-operated control valve 236 is arranged above the first solenoid-operated control valve 235 and above the crankshaft 36, and at least a portion (in this embodiment, a most portion) of the first solenoid-operated control valve 235 is arranged in front of the crankshaft 36. Thus, the clutch control device 220 can be arranged in a space extending from an upper side to a front side of the crankshaft 36 which is larger than a space formed between the crankshaft 36 and the clutch device 102, the crankshaft 36 and the clutch device 102 can be arranged in a state wherein a distance between the axes of the crankshaft 36 and the clutch device 102 is shortened and, at the same time, it is also possible to allow the flow of air to easily impinge on the first and second solenoid-operated control valves 235, 236.

The clutch control device 220 is arranged inside the outermost end of the clutch cover 92. Thus, it is possible to suppress the projection of the clutch control device 220 from a right side of the crankcase 35 as much as possible whereby it is no more necessary to take the influence of the arrangement of the clutch control device 220 on a banking angle of the vehicle into consideration.

Further, the clutch control device 220 is arranged outside the clutch device 102 as viewed in the direction along the axis of the clutch device 102. Thus, by mounting the clutch control device 220 on the outer surface of the clutch cover 92 while avoiding the clutch device 102 which projects most from a right side of the crankshaft 35, it is possible to restrict the large-sizing of the power unit P in the lateral direction as much as possible.

The first oil filter 216 is mounted on the clutch cover 92, the first oil filter 216 is arranged between the axes C2, C3 of the crankshaft 36 and the clutch device 102 and, at the same time, below the axes C2, C3. Accordingly, the first oil filter 216 can be arranged by effectively making use of the space formed between the crankshaft 36 and the clutch device 102 and below the crankshaft 36 and the clutch device 102 thus ensuring the degree of freedom in design of the parts arranged above the crankshaft 36 such as the setting of an inner diameter of the cylinder bore 42 arranged above the crankshaft 36 or the arrangement of the timing power transmission mechanisms 95, 98. Further, a sufficient space is defined on an inner side of the engine body 33 between the axis C2 of the crankshaft 36 and the axis C3 of the clutch device 102 and below these axes C2, C3. Thus, it is possible to restrict the projection of the first oil filter 216 in the direction along the axis of the crankshaft 36 without imposing a restriction on the degree of freedom in arrangement of other parts. Further, the first oil filter 216 is arranged below the crankshaft 36. Thus, it is possible to lower the center of gravity of the motorcycle.

Further, the first oil filter 216 is arranged inside the axial outer end 102a of the clutch device 102 in a state that the first oil filter 216 overlaps with a portion of the clutch device 102 as viewed in a plan view. Thus, it is possible to prevent the power unit P from becoming large-sized in the axial direction of the crankshaft 36 due to the mounting of the first oil filter 216. In addition, at the same time, it is possible to prevent the banking angle from being influenced by the projection of the first oil filter 216 from the clutch cover 92.

Further, the first oil filter 216 is arranged below the crankshaft 36 and outside the clutch device 102 as viewed in the direction along the axis of the clutch device 102 in a state that at least a portion of the filtering material 243 which is the constitutional element of the first oil filter 216 projects outwardly from the outer surface of the clutch cover 92 in the direction along the axis of the crankshaft 36. Thus, the flow of air can easily impinge on the first oil filter 216 thus enhancing the cooling property of the first oil filter 216.

Further, the first oil filter 216 is arranged in a state wherein a portion of the first oil filter 216 overlaps with the water pump 208, the first and second oil pumps 209, 210, and the scavenging pump 211 as viewed in a side view. Thus, the oil passage 215 which connects the first oil pump 209 and the first oil filter 216 can be formed linearly by arranging the first oil pump 209 and the first oil filter 216 close to each other. Accordingly, it is possible to shorten a length of the oil passage 215 and simply the structure of the oil passage 215.

Further, the oil passages 237, 238 which connects the clutch device 102 and the clutch control device 220 which controls the oil pressure applied to the clutch device 102 are formed in the clutch cover 92. Thus, by collectively arranging the clutch control device 220 and the oil passages 237, 238 which connect the clutch device 102 and the clutch control device 220 to the clutch cover 92, it is possible to perform the maintenance of the vehicle from a side portion of the engine body 33 whereby the maintenance of the vehicle can be easily performed. Further, by removing the clutch cover 92 from the crankcase 33, the clutch control device 220 and the oil passages 237, 238 can be collectively removed from the engine body 33. Thus, the maintenance of the vehicle can be further easily performed. Further, by shortening the lengths of the oil passages 237, 238 which connect the clutch control device 220 and the clutch device 102, it is possible to simplify the structure of the clutch control device and, at the same time, it is possible to enhance the oil-pressure transmission efficiency while avoiding the increase of weight of the clutch control device attributed to the oil passages 237, 238.

Further, the first oil filter 216 is mounted on the clutch cover 92 in a detachable manner from the outside. Thus, the maintenance property of the first oil filter 216 can be enhanced. Further, the first and second solenoid-operated control valves 235, 236 which constitute the clutch control device 220 and the first oil filter 216 are mounted on the clutch cover 92 at positions different from each other in the vertical direction of the engine body 33. Thus, although the first and second solenoid-operated control valves 235, 236 and the first oil filter 216 are mounted on the clutch cover 92, it is possible to prevent the first and second solenoid-operated control valves 235, 236 and the first oil filter 216 from largely projecting sideward from the engine body 33.

Further, the clutch control device 220, the oil passages 237, 238 which connect the clutch control device 220 and the clutch device 102 and the first oil filter 216 are mounted on the clutch cover 92 which is joined to the side surface of the crankcase 35 on a side opposite to the side stand 34 in the width direction of the vehicle body frame F. Thus, when the motorcycle is in a parking state in which the side stand 34 is erected, the clutch cover 92 is inclined in the oblique upward direction. Accordingly, the maintenance of the clutch control device 220, the oil passages 237, 238, and the first oil filter 216 can be easily performed.

Further, although the pressure reducing valve 222 is put in the middle of the second branched oil passage 219 which connects the first oil filter 216 and the valve-operating oil-pressure control device 221 with each other, the pressure reducing valve 222 is mounted on the clutch cover 92 in a state that the pressure reducing valve 222 is arranged directly in the vicinity of the first oil filter 216. Thus, the pressure reducing valve 222 and the first oil filter 216 can be arranged in a compact shape while efficiently using the required oil pressure. Further, by merely removing the clutch cover 92 from the crankcase 35, it is possible to remove the clutch control device 220 and the parts including the pressure reducing valve 222 provided for the valve-operating oil-pressure control device 221 thus further facilitating the maintenance of the first oil filter 216.

Further, the substantially cylindrical-shaped filter casing 239 of the first oil filter 216 is mounted on the crankcase 35 in a state that the filter casing 239 projects outwardly from the crankcase 35, and the pressure reducing valve 222 is arranged in a state that at least a portion of the pressure reducing valve 222 overlaps with the first oil filter 216 as viewed in the axial direction of the filter casing 239. Thus, it is possible to arrange the pressure reducing valve 222 and the first oil filter 216 further close to each other thus contributing to the formation of the power unit P in a more compact shape.

Further, it is possible to easily constitute the power unit P which includes the pressure reducing valve 222 and the first oil filter 216 or the power unit which includes neither the pressure reducing valve nor the oil filter selectively using the same engine body 33.

Further, the discharge port of the first oil pump 209 is connected to the intake-side and exhaust-side valve-operation-state changing mechanisms 63, 64 and the clutch device 102 in common. Thus, it is possible to prevent the increase of the mass of the power unit P thus constituting a hydraulic system associated with the intake-side and exhaust-side valve-operation-state changing mechanisms 63, 64 and the clutch device 102 in a compact shape. Accordingly, it is possible to manufacture the power unit P suitable for the motorcycle.

Further, out of the clutch control device 220 and the valve-operating oil-pressure control device 221 which constitute the oil-pressure control mechanism, the pressure reducing valve 222 is put in the middle of the second branched oil passage 219 which is connected with the valve-operating oil-pressure control device 221. Accordingly, it is possible to properly and efficiently control the oil pressure of the clutch control device 220 and the oil pressure of the valve-operating oil-pressure control device 221.

Further, out of the first and second branched oil passages 218, 219 which are branched from the first oil pump 209 and are connected with the clutch control device 220 and the valve-operating oil-pressure control device 221 respectively, the pressure reducing valve 222 is put in the middle of the second branched oil passage 219. Thus, it is possible to properly, efficiently and collectively assemble the hydraulic system so as to apply the oil pressures suitable for the clutch control device 220 and the valve-operating oil-pressure control device 221.

Further, it is possible to change over the intake-side and exhaust-side valve-operation-state changing mechanisms 63, 64 at the oil pressure lower than the oil pressure applied to the clutch device 102, and the oil pressure of the first oil pump 209 is supplied to the intake-side and exhaust-side valve-operation-state changing mechanisms 63, 64 after being reduced by the pressure reducing valve 222. Thus, it is possible to apply the oil pressures suitable for the intake-side and exhaust-side valve-operation-state changing mechanisms and the clutch device 102 respectively.

Although the embodiment of the present invention has been explained heretofore, the present invention is not limited to the above-mentioned embodiment, and various modifications in design are conceivable without departing from the present invention described in claims.

What is claimed is:

1. A motorcycle power unit comprising:
a crankcase forming a portion of an engine body mounted on a vehicle body frame;
a clutch device arranged in a power transmission path between the crankshaft and a drive wheel so as to engage or disengage the transmission of rotational power of the crankshaft which is rotatably supported on the crankcase toward the drive wheel;
a clutch cover joined to either one of left and right side surfaces of the crankcase in a state wherein the crankcase is mounted on the vehicle body frame so as to form a clutch chamber for housing the clutch device between the clutch cover and the crankcase; and
a clutch control device for performing a changeover of engagement and disengagement of the clutch device;
wherein the clutch control device performs the changeover of engagement and disengagement of the clutch device by controlling an oil pressure applied to the clutch device and oil passages for connecting the clutch control device and the clutch device with each other are mounted on the clutch cover;
wherein the clutch device includes a twin type which includes first and second clutches, and a pair of individual control means which constitutes the clutch control device for individually controlling engagement and disengagement of the first and second clutches, and
wherein the clutch control device is attached to the outer side surface of the clutch cover while the two individual control means are disposed at different positions from each other both in the front-and-rear direction and in the up-and-down direction so that the two individual control means easily come in contact with a flow of air.

2. The motorcycle power unit according to claim 1, wherein an oil filter is arranged between the clutch control device and an oil pump is mounted on the clutch cover in a detachable manner from the outside.

3. The motorcycle power unit according to claim 2, wherein the motorcycle power unit includes first and second branched oil passages in which oil discharged from the oil pump flows in a bifurcated manner, the first branched oil passage is connected to the clutch control device, the second branched oil passage with a pressure-reducing valve mounted on the clutch cover is connected to another oil-pressure control device.

4. The motorcycle power unit according to claim 3, wherein the control means and the oil filter are arranged at positions different from each other in the vertical direction of the engine body.

5. The motorcycle power unit according to claim 4, wherein the clutch cover is joined to a side surface of the crankcase on a side opposite to a side stand supported on the vehicle body frame or the engine body in the width direction of the vehicle body frame.

6. The motorcycle power unit according to claim 3, wherein the clutch cover is joined to a side surface of the crankcase on a side opposite to a side stand supported on the vehicle body frame or the engine body in the width direction of the vehicle body frame.

7. The motorcycle power unit according to claim 2, wherein the control means and the oil filter are arranged at positions different from each other in the vertical direction of the engine body.

8. The motorcycle power unit according to claim 7, wherein the clutch cover is joined to a side surface of the crankcase on a side opposite to a side stand supported on the vehicle body frame or the engine body in the width direction of the vehicle body frame.

9. The motorcycle power unit according to claim 2, wherein the clutch cover is joined to a side surface of the crankcase on a side opposite to a side stand supported on the vehicle body frame or the engine body in the width direction of the vehicle body frame.

10. The motorcycle power unit according to claim 1, wherein the clutch cover is joined to a side surface of the crankcase on a side opposite to a side stand supported on the vehicle body frame or the engine body in the width direction of the vehicle body frame.

11. A motorcycle power unit comprising:
a crankcase forming a portion of an engine body mounted on a vehicle body frame;
a clutch device operatively connected to a crankshaft to engage or disengage the transmission rotational power of the crankshaft which is rotatably supported on the crankcase;
a clutch cover joined to at least one of a left side surface or a right side surface of the crankcase for forming a clutch chamber for housing the clutch device between the clutch cover and the crankcase;
a clutch control device for performing a changeover of engagement and disengagement of the clutch device by controlling an oil pressure applied to the clutch device; and
oil passages for connecting the clutch control device and the clutch device with each other, said oil passages being mounted on the clutch cover
wherein the clutch device includes a twin type which includes first and second clutches, and a pair of individual control means which constitutes the clutch control device for individually controlling engagement and disengagement of the first and second clutches, and
wherein the clutch control device is attached to the outer side surface of the clutch cover while the two individual control means are disposed at different positions from each other both in the front-and-rear direction and in the up-and-down direction so that the two individual control means easily come in contact with a flow of air.

12. The motorcycle power unit according to claim 11, wherein an oil filter is arranged between the clutch control device and an oil pump is mounted on the clutch cover in a detachable manner from the outside.

13. The motorcycle power unit according to claim 12, wherein the motorcycle power unit includes first and second branched oil passages in which oil discharged from the oil pump flows in a bifurcated manner, the first branched oil passage is connected to the clutch control device, the second branched oil passage with a pressure-reducing valve mounted on the clutch cover is connected to another oil-pressure control device.

14. The motorcycle power unit according to claim 13, wherein the control means and the oil filter are arranged at positions different from each other in the vertical direction of the engine body.

15. The motorcycle power unit according to claim 14, wherein the clutch cover is joined to a side surface of the crankcase on a side opposite to a side stand supported on the vehicle body frame or the engine body in the width direction of the vehicle body frame.

16. The motorcycle power unit according to claim 13, wherein the clutch cover is joined to a side surface of the crankcase on a side opposite to a side stand supported on the vehicle body frame or the engine body in the width direction of the vehicle body frame.

17. The motorcycle power unit according to claim 12, wherein the control means and the oil filter are arranged at positions different from each other in the vertical direction of the engine body.

18. The motorcycle power unit according to claim 17, wherein the clutch cover is joined to a side surface of the crankcase on a side opposite to a side stand supported on the vehicle body frame or the engine body in the width direction of the vehicle body frame.

19. The motorcycle power unit according to claim 12, wherein the clutch cover is joined to a side surface of the crankcase on a side opposite to a side stand supported on the vehicle body frame or the engine body in the width direction of the vehicle body frame.

20. The motorcycle power unit according to claim 11, wherein the clutch cover is joined to a side surface of the crankcase on a side opposite to a side stand supported on the vehicle body frame or the engine body in the width direction of the vehicle body frame.

* * * * *